(12) United States Patent
Akiyama et al.

(10) Patent No.: US 8,413,223 B2
(45) Date of Patent: Apr. 2, 2013

(54) CONTENT DISPLAY DEVICE

(75) Inventors: Takumi Akiyama, Tokyo (JP); Shigeru Imai, Tokyo (JP); Shin Miura, Tokyo (JP); Masami Matsubara, Tokyo (JP); Shinji Akatsu, Tokyo (JP); Takehiko Hanada, Tokyo (JP); Hiroki Sakaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 247 days.

(21) Appl. No.: 12/936,656

(22) PCT Filed: Apr. 7, 2008

(86) PCT No.: PCT/JP2008/000890
§ 371 (c)(1),
(2), (4) Date: Oct. 6, 2010

(87) PCT Pub. No.: WO2009/125450
PCT Pub. Date: Oct. 15, 2009

(65) Prior Publication Data
US 2011/0041174 A1 Feb. 17, 2011

(51) Int. Cl.
*H04N 7/16* (2011.01)
*G06F 15/16* (2006.01)
(52) U.S. Cl. ............................. 726/7; 709/231; 725/131
(58) Field of Classification Search .................. None
See application file for complete search history.

(56) References Cited

U.S. PATENT DOCUMENTS

| 7,058,726 | B1 | 6/2006 | Osaku et al. | |
|---|---|---|---|---|
| 2006/0161425 | A1* | 7/2006 | Lee et al. | 704/201 |
| 2006/0277316 | A1* | 12/2006 | Wang et al. | 709/231 |
| 2007/0094702 | A1* | 4/2007 | Khare et al. | 725/134 |
| 2008/0086750 | A1* | 4/2008 | Yasrebi et al. | 725/86 |
| 2010/0135279 | A1* | 6/2010 | Petersson et al. | 370/352 |

FOREIGN PATENT DOCUMENTS

| JP | 10-78928 A | 3/1998 |
|---|---|---|
| JP | 2000-357174 A | 12/2000 |
| JP | 2003-298967 A | 10/2003 |
| JP | 2004-227401 A | 8/2004 |

* cited by examiner

*Primary Examiner* — Hadi Armouche
*Assistant Examiner* — Jaron K Brunner
(74) *Attorney, Agent, or Firm* — Birch, Stewart, Kolasch & Birch, LLP

(57) ABSTRACT

A content display device includes a content setting storage means 106 for storing a content setting which associates a content selection request with a content which an external device has, a content setting server means 107 for accepting a content setting from a content setting client 108 on a network to update and manage content settings stored in the content setting storage means 106, and a display content management means 109 for reading a content setting corresponding to the content selection request from the content setting storage means 106 to present the content which the content setting client 108 has to a display means 102, or, when the content setting corresponding to the content setting request does not exist, displaying a method of accessing the content setting server means 107 and identification information for identifying the content setting client 108 on the display means 102.

16 Claims, 29 Drawing Sheets

FIG.2

| Channel Number (201) | Channel (202) |
|---|---|
| 1 | ○○ Broadcast |
| 2 | Configurator: Mr. Tanaka |
| 3 | ×× Television |
| 4 | △△ Network |
| 5 | Configurator: Mr. Sato |

FIG.3

| Content Number (301) | Content (302) | Title (303) | Comment (304) |
|---|---|---|---|
| 1 | http//:www.videosharingsite.com/12345 | Walking Tiger | Swaggering |
| 2 | http//:www.videosharingsite.com/67890 | | |
| 3 | http//:www.anothersite.com/?id=98765 | | |

| Channel Number | Channel | Password |
|---|---|---|
| 1 | ○○ Broadcast | |
| 2 | Configurator: Mr. Tanaka | K3f0J5sV |
| 3 | ×× Television | |
| 4 | △△ Network | |
| 5 | Configurator: Mr. Sato | w9kMDp1L |

201 Channel Number, 202 Channel, 203 Password

FIG.19

| Group Name | Configurator |
|---|---|
| Company | Mr. Tanaka |
|  | Mr. Sato |
|  | Mr. Yamada |
| Sandlot Baseball Team | Mr. Takahashi |
|  | Mr. Sato |

401 — Group Name column
402 — Configurator column

CONTENT DISPLAY DEVICE

FIELD OF THE INVENTION

The present invention relates to a content display device. More particularly, it relates to a content display device that makes easy to acquire information which the user desires.

BACKGROUND OF THE INVENTION

As computer technologies and communication technologies have developed in recent years, means for information acquisition, means for provision of information, and communication means have become sophisticated and complicated while individuals can use personal computers and the Internet freely. Methods of using those means and methods of operating those means have also complicated. Patent reference 1 discloses, as a measure against this problem, a system that sends Internet information destined for information-starved people and so on to television sets and so on using a push service without making the user operate his or her personal computer or the like. The user makes a request of a specific operator or sets a desired genre via telephone, and the operator sets the URL (Uniform Resource Locator) of a destination site which provides information meeting the user's desire to a WWW (World Wide Web) server managed thereby, and the user's television set refers to the WWW server and is sent to the destination URL to acquire information or advertisements.
[Patent reference 1] JP,2003-298967,A Because the conventional system is constructed as mentioned above, there is no relation between the operation of making a request of an operator (configurator) via telephone to make a setting, and the operation of making the TV set display information, and hence there is a separation between them. A problem is therefore that the user cannot intuitively associate a setting with display of information (e.g., content watching), the user has a trouble in making a request of the operator to make a setting to receive information via television or the like. A further problem is that because the user can receive only a setting service provided by a predetermined operator and a server on the Internet needs to be managed in order for the operator to set a content, the load on the operator is high and the user cannot make a request of an arbitrary configurator, such as his or her friend, to make a setting to acquire information with flexibility.

The present invention is made in order to solve the above-mentioned problems, and it is therefore an object of the present invention to provide a content display device that enables the user to easily associate a setting with display of information, and to make a request of an arbitrary configurator to make a setting to acquire information with flexibility.

DESCRIPTION OF THE INVENTION

A content display device in accordance with the present invention includes: an input means which is an input interface for accepting a content selection request to select a content from outside the content display device; a display means for displaying the above-mentioned content selected using the above-mentioned input means; a communication means for communicating with an external device on a network; a receiving means for receiving a content which an external client device has via the above-mentioned communication means; a content setting storage means for storing a content setting which associates the above-mentioned content selection request with a content which the above-mentioned external device has; a content setting server means for accepting a content setting from the external client device on the above-mentioned network to update and manage content settings stored in the above-mentioned content setting storage means; and a display content management means for reading a content setting corresponding to the above-mentioned content selection request from the above-mentioned content setting storage means to present the content which the above-mentioned external client device has to the above-mentioned display means, or, when the content setting corresponding to the above-mentioned content setting request does not exist in the content setting storage means, displaying a method of accessing the above-mentioned content setting server means and identification information for identifying the external client device on the above-mentioned display means.

Because the content display device in accordance with the present invention is configured in such a way as to include: the input means which is an input interface for accepting a content selection request to select a content from outside the content display device; the display means for displaying the content selected using the input means; the communication means for communicating with the external device on the network; the receiving means for receiving a content which the external client device has via the communication means; the content setting storage means for storing a content setting which associates the content selection request with a content which the external device has; the content setting server means for accepting a content setting from the external client device on the network to update and manage content settings stored in the content setting storage means; and the display content management means for reading a content setting corresponding to the content selection request from the content setting storage means to present the content which the external client device has to the display means, or, when the content setting corresponding to the content setting request does not exist in the content setting storage means, displaying a method of accessing the content setting server means and identification information for identifying the external client device on the display means, the user is enabled to intuitively associate a setting with display of information and cause the content display device to display a content easily to watch the content. In addition, the user is enabled to make a request of an arbitrary configurator to make a setting, and acquire information with flexibility.

BRIEF DESCRIPTION OF THE FIGURES

FIG. 2 is a table showing content setting information of the content display device in accordance with Embodiment 1 of the present invention;

FIG. 3 is a table showing content setting information of the content display device in accordance with Embodiment 1 of the present invention;

FIG. 19 is a table showing group management settings made by the content display device in accordance with Embodiment 4 of the present invention;

PREFERRED EMBODIMENTS OF THE INVENTION

Hereafter, in order to explain this invention in greater detail, the preferred embodiments of the present invention will be described with reference to the accompanying drawings. Embodiment 1.

Figure 1:
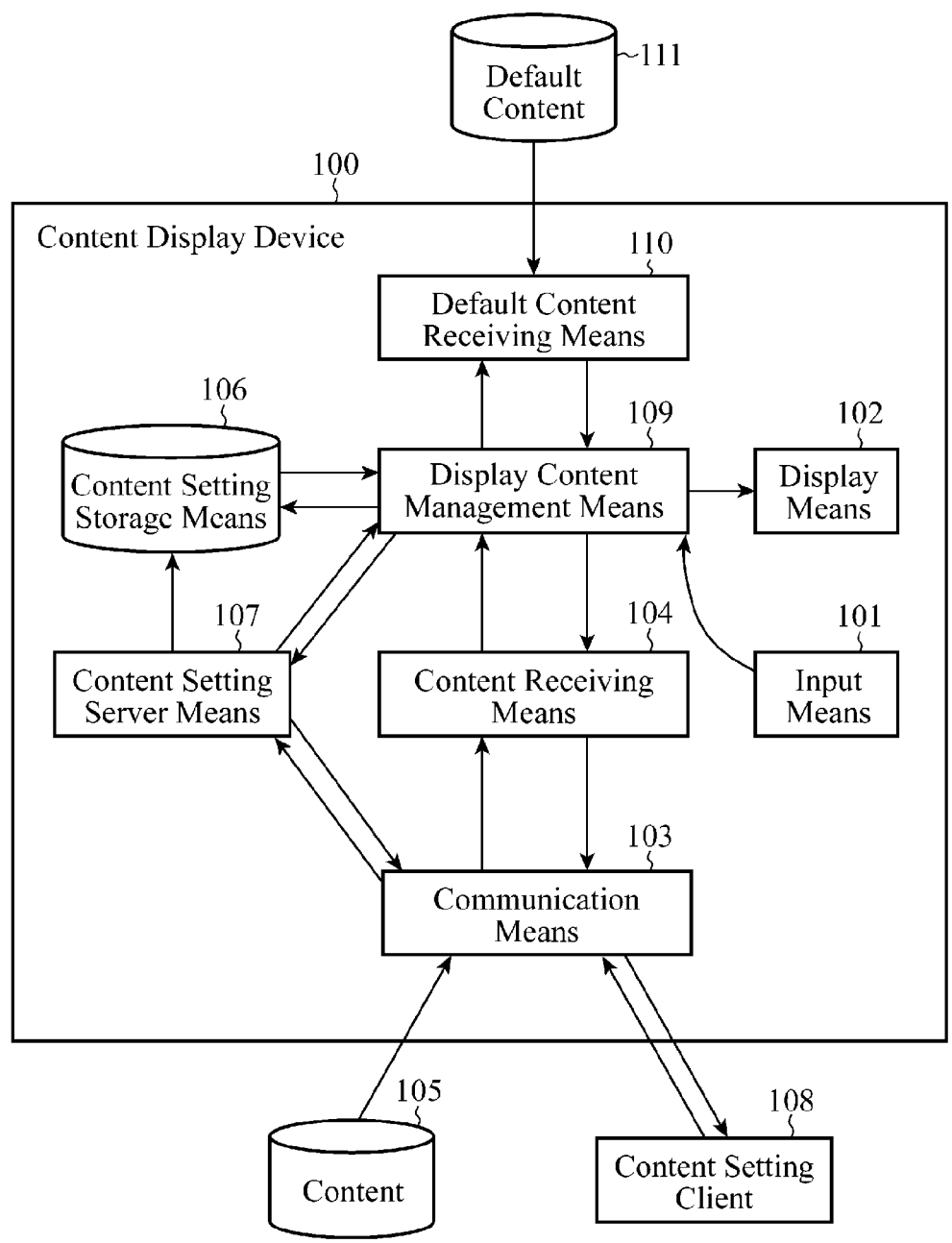
FIG. 1 is a block diagram showing the structure of a content display device in accordance with Embodiment 1 of the present invention.

FIG. 1 is a block diagram showing the configuration of a content display device in accordance with Embodiment 1 of the present invention.

This content display device 100 is comprised of an input means 101, a display means 102, a communication means 103, a content receiving means (a receiving means) 104, a content setting storage means 106, a content setting server means 107, a display content management means 109, and a default content receiving means 110.

The input means 101 is an input interface for accepting a content selection request from a user, and has numeric keys and an up-and-down key. The user can specify a content which he or she desires to watch by specifying a number using the keys. The display means 102 has a screen for displaying a content. This screen does not necessarily need to be physically integral with the content display device 100, and can be a display, a TV receiver, or the like which is disposed outside the content display device 100 and connected to the content display device 100 via a video image cable or the like.

The communication means 103 communicates with other equipment on a network. This communication means 103 can use TCP/IP (Transmission Control Protocol/Internet Protocol). The content receiving means 104 receives a content 105 which the other equipment on the network has by way of the communication means 103. The content 105 can be a video image, a sound, an image, a document, or the like on a TCP/IP network. The content setting storage means 106 stores content settings each of which associates a content selection request made by the user with a content on the network.

The content setting server means 107 accepts a content setting via the network from a content setting client (an external client device) 108 to manage and update the content settings which the content setting storage means 106 has. This content setting server means 107 can be an HTTP (Hypertext Transfer Protocol) server that provides a Web page. The content setting client 108 can be a Web browser that operates on a PC (Personal Computer). Needless to say, the content setting server means 107 and the content setting out client 108 can use another network configuration. For example, an SIP (Session Initiation Protocol) user agent, instead of the HTTP server, can be used as the content setting server means 107 and an SIP user agent, instead of the Web browser, can also be used as the content setting client 108, and these SIP user agents can establish a session through an SIP network to make a setting or the like.

The display content management means 109 manages the display produced by the display means 102 in response to the user's request inputted by using the input means 101. More specifically, the display content management means 109 displays the content on the channel corresponding to the channel number specified by the user on the display means 102. Unless the content setting corresponding to the users request exists in the content setting storage means, the display content management means displays the server address of the content setting server means 107 and configurator identification information for identifying each content setting client 108 on the display means 102. Furthermore, the display content management means 109 can write information in the content setting storage means 106. For example, the display content management means can delete a content setting in response to a request from the user or at the time when the user ends the watching of a content. The display content management means 109 can be alternatively configured in such a way as to carry out the management for, for example, each content without using channels.

An example of content settings which the display content management means 109 reads from the content setting storage means 106 is shown in FIG. 2. Each content setting includes a channel number 201 and a channel 202. The channel number 201 shows a number which the user can specify by using the input means 101, and the channel 202 is a set of contents related with the channel number 201 or a series of the contents which are arranged in time sequence.

In FIG. 2, the channel 202 related with each of the channel numbers 201 "1, 3, and 4" is a channel via which a default content which is received by the default content receiving means 110 is transmitted. The channels 202 related with the channel numbers 201 "2 and 5" are channels via which contents which are set by those, respectively referred to as "Mr. Tanaka" and "Mr. Sato", who make content settings by using their content setting clients 108 (each referred to as a configurator from here on) are transmitted respectively.

FIG. 3 shows detailed content settings made for the channel of the "Configurator: Mr. Tanaka" shown in FIG. 2, and each of the content settings is comprised of a content number 301, a content 302, a title 303, and a comment 304. The content number 301 shows the playback order of the content, the content 302 shows the location of the content on the network, the title 303 shows the title of the content, and the comment 304 shows a comment which the configurator has made on the content. In addition to the title 303 and the comment 304, other metadata, such as a tag and evaluation, can be stored in each content setting. The configurators can be arbitrarily chosen from among the user's relatives and friends by the user. As shown in FIG. 2, the content display device can be configured in such a way as to allow two or more configurators to make content settings independently.

The default content receiving means 110 receives the default content 111 which is a preset content. In this embodiment, although it is assumed that the default content receiving means 110 and the default content 111 are a broadcast wave receiving function and a broadcast content respectively, the default content ill can be another content, for example, an IP broadcast content and the default content receiving means 110 and the default content 111 are not indispensable from the viewpoint of the configuration of the content display device.

Figure 4:
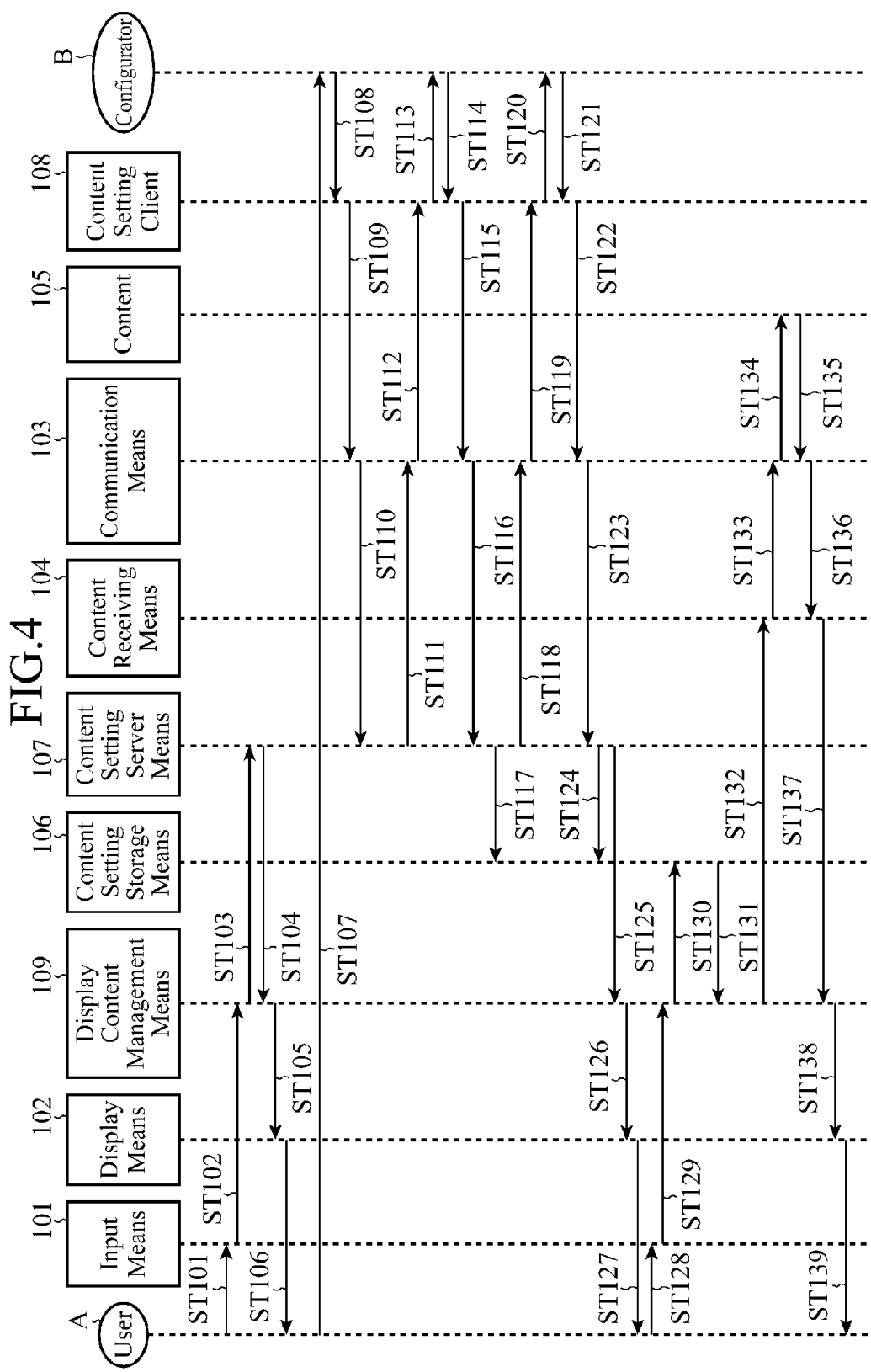
FIG. 4 is a flow chart showing the operation of the content display device in accordance with Embodiment 1 of the present invention.

Next, an operation which the content display device performs until a user starts watching a content after the user issues a content watching request to the content display device 100 will be explained with reference to a flow chart of FIG. 4.

A user A makes a content watching request by using the input means 101 (step ST101). In this Embodiment 1, it is assumed that the content watching request is done through specification of a channel number by a pushdown of either a numeric key or the up-and-down key which the input means 101 has. Needless to say, the content watching request can be done through another operation. Because the specification of a channel number by a pushdown of either the numeric key or the up-and-down key is the same as that which is done when the user watches a preset content (the user specifies a different channel number), the user A can watch the content (not the preset content) in the same way that the user watches the preset default content. In this case, it is assumed that the specified channel number is "2".

The input means 101 transmits the content watching request to the display content management means 109 (step ST102). It is assumed that any content setting which associates this request with a content has not existed yet at this time. Because any content setting which associates the request with a content has not existed yet, the display content management means 109 makes a request of the content setting server means 107 for the server address (step ST103). The content setting server means 107 sends the server address back to the display content management means 109 in response to the inputted request (step ST104). The display content management means 109 outputs a display command for displaying both the server address and the configurator identification information to the display means 102 (step ST105).

Figure 5:
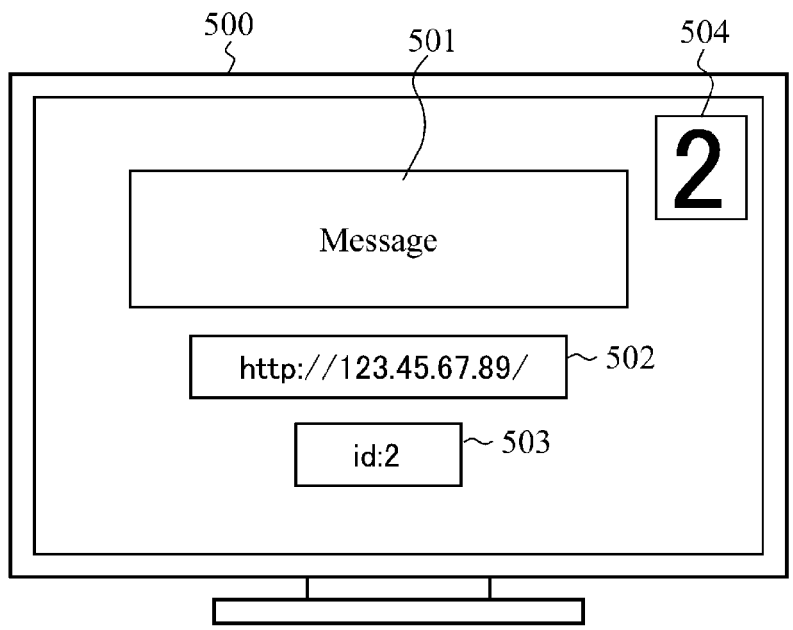
FIG. 5 is a view showing information displayed on a display means of the content display device in accordance with Embodiment 1 of the present invention.

FIG. 5 shows an example of the display of the server address and the configurator identification information on the display means 102. On the screen 500 of the display means 102, a message 501 for the user A's convenience, the server address 502 of the content setting server means 107, the configurator identification information 503 for identifying the configurator B, and the channel number 504 are displayed. For example, "Please tell your friend this address and id" or the like is displayed in the message 501. In FIG. 5, although the configurator identification information 503 is the same as the channel number 504, the configurator identification information is not necessarily the same as the channel number.

The user A acquires the server address and the configurator identification information which are displayed on the display means 102 (step ST106), and informs them to the configurator B which the user has chosen (in this case, "Mr. Tanaka") (step ST107). In this Embodiment 1, any method can be used as a method of informing the server address and the configurator identification information to the configurator. For example, they can be informed via voice, telephone, facsimile, mail, or e-mail. The configurator B inputs the server address informed thereto to the content setting client 108 (step ST108), and makes a request of the content setting server means 107 for an initial setting screen via the network (steps ST109 and ST110). The content setting server means 107 sends the initial setting screen to the content setting client 108 (steps ST111 and ST112), and the content setting client 108 displays the initial setting screen (step ST113).

Figure 6:
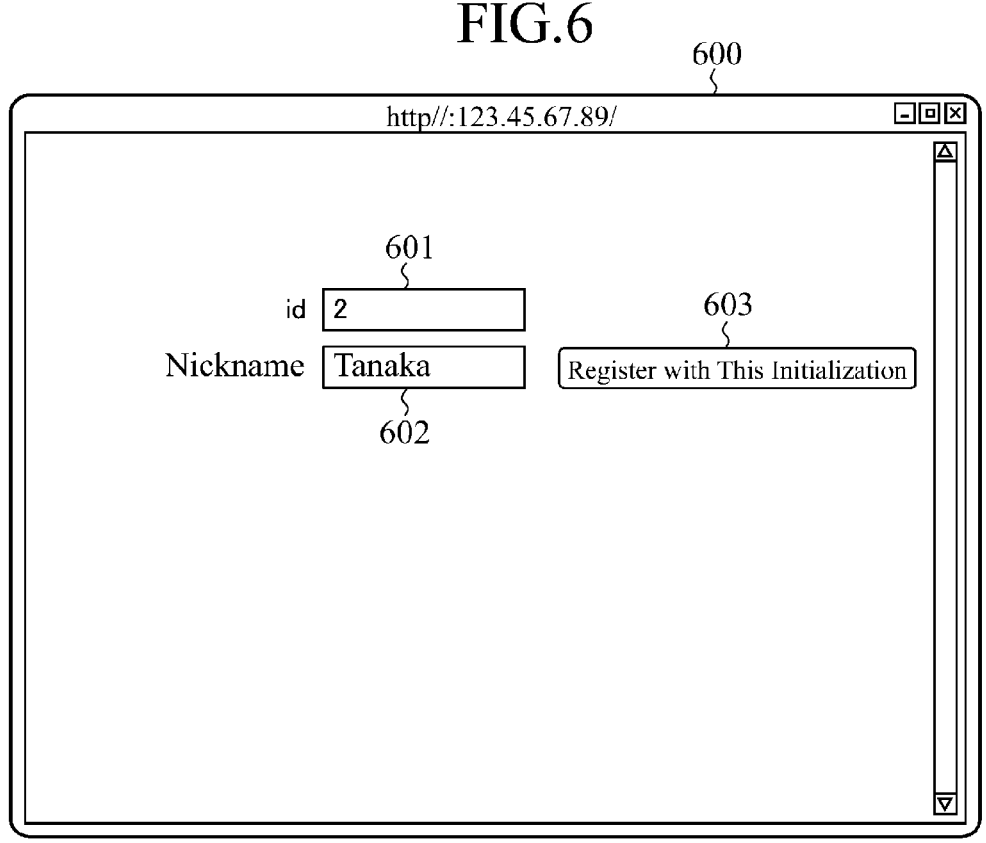
FIG. 6 is a view showing information displayed on a content setting client in accordance with Embodiment 1 of the present invention.

FIG. 6 shows an example of the initial setting screen which is displayed on the content setting client 108. On the screen 600 of the content setting client 108, an input box 601 for the configurator identification information, an input box 602 for the nickname of the configurator B, and a button 603 for transmission of initial setting information are displayed. In this case, the nickname of the configurator B is not indispensable, and the configurator B can be alternatively made to input other information about the configurator B.

The configurator B inputs the configurator identification information informed thereto and the other information about the configurator B, such as the nickname of the configurator B, to the initial setting screen by using the content setting client 108 (step ST114), and the content setting client 108 transmits these pieces of initial setting information to the content setting server means 107 via the communication means 103 (steps ST115 and ST116). The content setting server means 107 writes the initial setting information received thereby in the content setting storage means 106 (step ST117). In the initial setting information, the channel number "2" which the user A has specified is written into a channel number 201 of a table shown in FIG. 2, and "Mr. Tanaka" which is the nickname of the configurator is written into a corresponding channel 202 of the table shown in FIG. 2, in step step ST101. When information different from the nickname of the configurator has been input as an initial setting item by the configurator, the information is also written into the content setting storage means. After that, the content setting server means 107 sends a content setting screen back to the configurator B via the communication means 103 and the content setting client 108 (steps ST118 and ST120).

Figure 7:
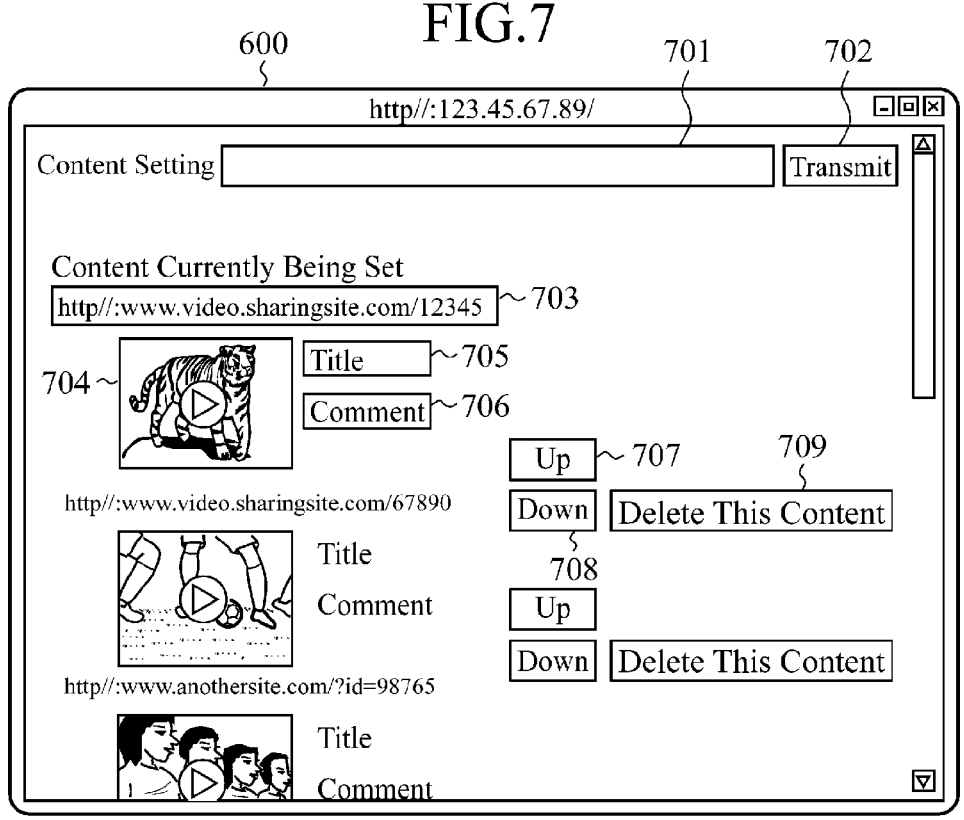
FIG. 7 is a view showing information displayed on the content setting client in accordance with Embodiment 1 of the present invention.

FIG. 7 shows an example of the setting screen which is displayed on the content setting client 108. On the screen 600 of the content setting client 108, a content setting box 701 for specifying a content on the network, a button 702 for transmitting the specified content to the content setting server means 107 as a content setting, an address 703 showing a content already set in the past and currently being set, a preview image 704 of the content currently being set, the title 705 of the content currently being set, a comment 706 which the configurator B has made on the content currently being set, buttons 707 and 708 for setting the playback order of the content currently being set, and a button 709 for deleting the content setting made to the content currently being set are displayed. FIG. 7 shows a state in which some content settings as shown in FIG. 3 already exist.

When the configurator B inputs a content to the content setting box 701 and then pushes the button 702, the setting of the content is transmitted to the content setting server means 107 via the content setting client 108 and the communication means 103 (steps ST121 to ST123). The configurator can also edit a previous content setting by using the title 705, the comment 706, and the buttons 707 and 708. The content setting server means 107 writes the received content setting into the content setting storage means 106 (step ST124).

The content setting is written and stored in the content setting storage means in such a way that "1" is written into a content number 301 of a table shown in FIG. 3 (when one or more settings have already existed, (the largest content number+1) is written into the content number), the address of the content which has been set in the content setting box 701 and will be displayed in the address 703 from this time is written into a corresponding content 302 of the table, the title which will be displayed in the title 303 from this time is written into a corresponding title 705 of the table, and the comment which will be displayed in the comment 706 from this time is written into a corresponding comment 304 of the table. When no title is set to the content, nothing is written into the corresponding field of the content setting storage means. Also when no comment is set to the content, nothing is written into the corresponding field of the content setting storage means. When there are metadata other than the title and the comment, it is desirable to also display the metadata on the setting screen shown in FIG. 7 to enable the configurator to edit the metadata. Those metadata can also be written into the table shown in FIG. 3, like the title and the comment.

After that, the content setting server means 107 outputs a request to display that the content setting has been made to the display content management means 109 on the display means 102 (step ST125), and the display means 102 displays that the content setting has been made to inform the user A to that effect (steps ST126 and ST127).

Figure 8:
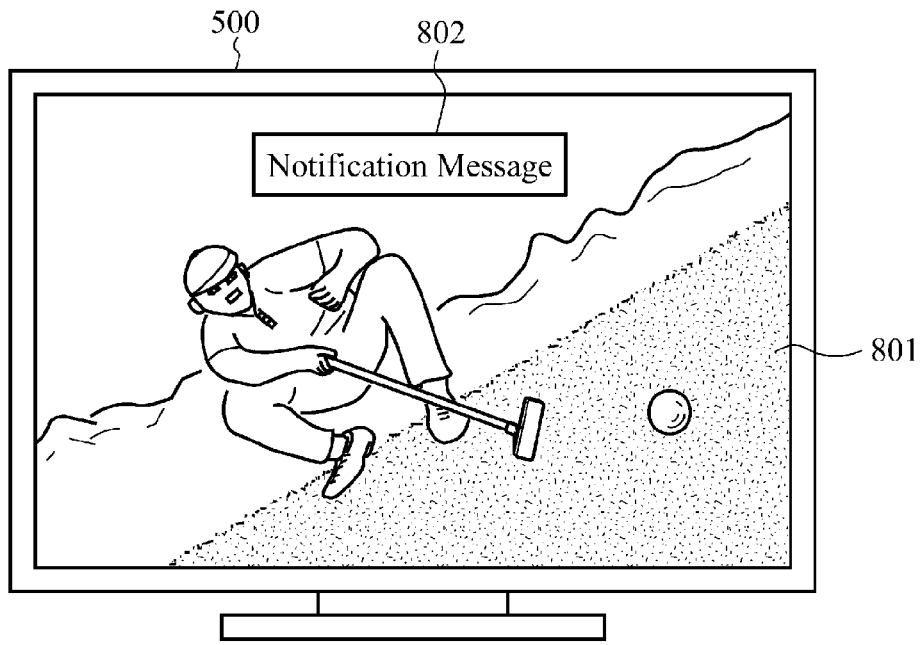
FIG. 8 is a view showing a display screen of the display means of the content display device in accordance with Embodiment 1 of the present invention.

FIG. 8 shows an example of a screen for informing that the content setting has been made which is displayed on the display means 102. On the screen 500 of the display means 102, a content 801 which the user A has been watching when informed that the content setting has been made and a notification message 802 to the user A (e.g., a message showing that "Mr. Tanaka has made a setting for channel 2") are displayed. At this time, the content 801 which the user A has been watching when informed that the content setting has been made is not limited to a content set by the configurator B "Mr. Tanaka". For example, while the user A watches the default content 111, the display means can inform the user that the content setting has been made.

The user A makes the content watching request again (step ST128). More specifically, the user pushes down the same numeric key as what was pushed down in step ST101. The input means 101 transmits the content watching request to the display content management means 109 (step ST129). The display content management means 109 makes a request of the content setting storage means 106 for the address of the specified content described in the content 302 shown in FIG. 3 (step ST130). The content setting storage means 106 sends the address of the specified content back to the display content management means (step ST131). The display content management means 109 makes a request of the content receiving means 104 for the specified content according to the address of the specified content sent thereto (step ST132). The content receiving means 104 makes a request of the content 105 on the network for the specified content by way of the communication means 103 (steps ST133 and ST134).

The content 105 which has received the request sends the substance of the specified content back to the content receiving means 104 (steps ST135 and ST136). Furthermore, the content receiving means 104 sends the substance of the specified content sent thereto to the display content management means 109 (step ST137). The display content management means 109 displays the specified content on the display means 102 (step ST138), so that the user A watches the specified content displayed on the display means (step ST139). Through these operations, the user A is enabled to watch the content which the configurator B "Mr. Tanaka" has set by specifying the channel number "2".

Figure 9:
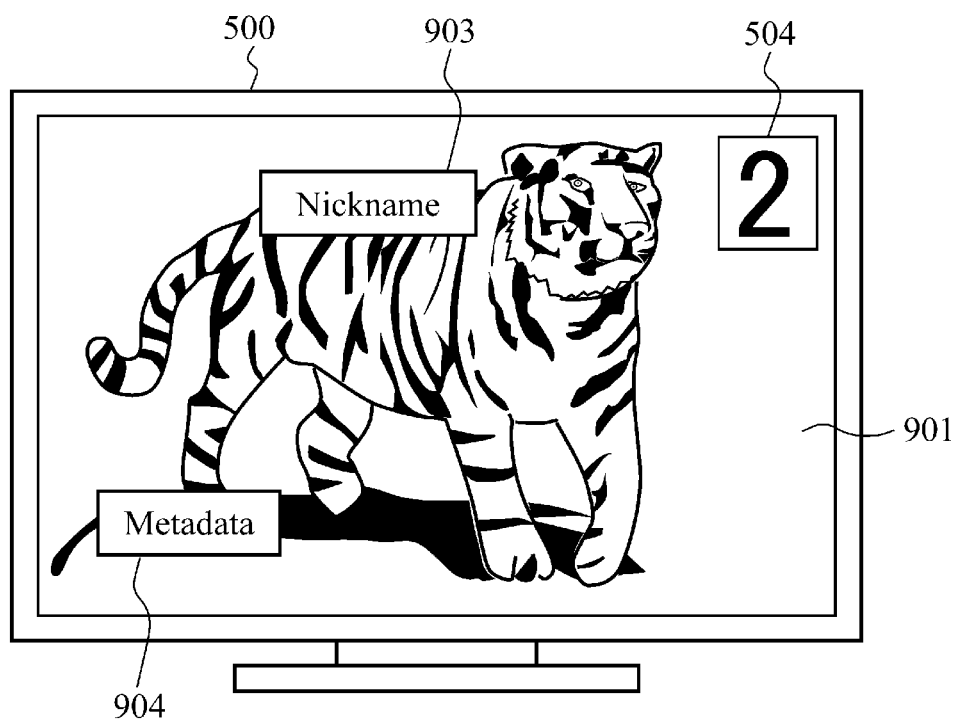
FIG. 9 is a view showing a display screen of the display means of the content display device in accordance with Embodiment 1 of the present invention.

FIG. 9 shows an example of a screen for displaying the content which the configurator B "Mr. Tanaka" has set on the display means 102. On the screen 500 of the display means 102, the content 901 being displayed, the nickname 903 of the content configurator (e.g., "Mr. Tanaka's content"), metadata 904 such as the title and comment of the content (e.g., "title: walking tiger" and "comment: swaggering"), and the channel number 504 are displayed. Although the data 903, 904, and 504 do not have to be displayed, it is preferable that they are displayed during at least a fixed time interval.

The configurator B can also add and edit a content setting as needed in steps ST121 to ST124 even after this sequence has been processed. The user A can also watch the content properly in steps ST128 to ST139. As an alternative, when making the content watching request of step ST101, the user A can specify another channel number other than "2", e.g., the channel number "5" to specify a different configurator, e.g., "Mr. Sato" to allocate the different configurator to the channel number "5", and can watch Mr. Sato's content via the channel number "5".

As mentioned above, because the content display device in accordance with this Embodiment 1 is configured in such a way as to have the display content management means 109 for providing the server address of the content setting server means 107 for the user when the user performs the same operation of specifying a channel number as that which the user does when usually watching a content, the content display device enables the user to intuitively associate a setting with display of information to be able to make a request of a configurator to make a content setting corresponding to the channel number, thereby enabling the user to easily display the content on the content display device to watch the content.

Furthermore, because the content display device in accordance with this Embodiment 1 is configured in such a way as to have the content setting storage means 106 for storing content settings to each of which a content which has been set by a configurator with the content being brought into correspondence with a channel number is assigned, the content display device enables the user to watch a content on the network by performing the same operation as that which the user performs when watching a default content.

In addition, because the content display device in accordance with this Embodiment 1 is configured in such a way as to have the content setting storage means 106 for storing content settings to each of which a content which has been set by a configurator with the content being brought into correspondence with a channel number is assigned and, and the content setting server means 107 for managing and updating the content settings, the content display device enables the user to choose one from among a plurality of configurators flexibly and arbitrarily for each channel number to cause the configurator which the user has chosen to make a setting.

Furthermore, because the content display device in accordance with this Embodiment 1 is configured in such a way as to make the content setting server means 107 public on the network to enable each configurator to access the content setting server means 107 by using the content setting client 108, the content display device enables each configurator to make a content setting via the network without managing a special server for providing setting services, thereby reducing the load on each configurator greatly. Furthermore, by making the content setting server means public, the content display device facilitates the setting operation of each configurator and enables the user to choose many friends and so on as configurators flexibly and arbitrarily to cause each of them to make a setting without using a specific operator.

Embodiment 2

Figure 10:
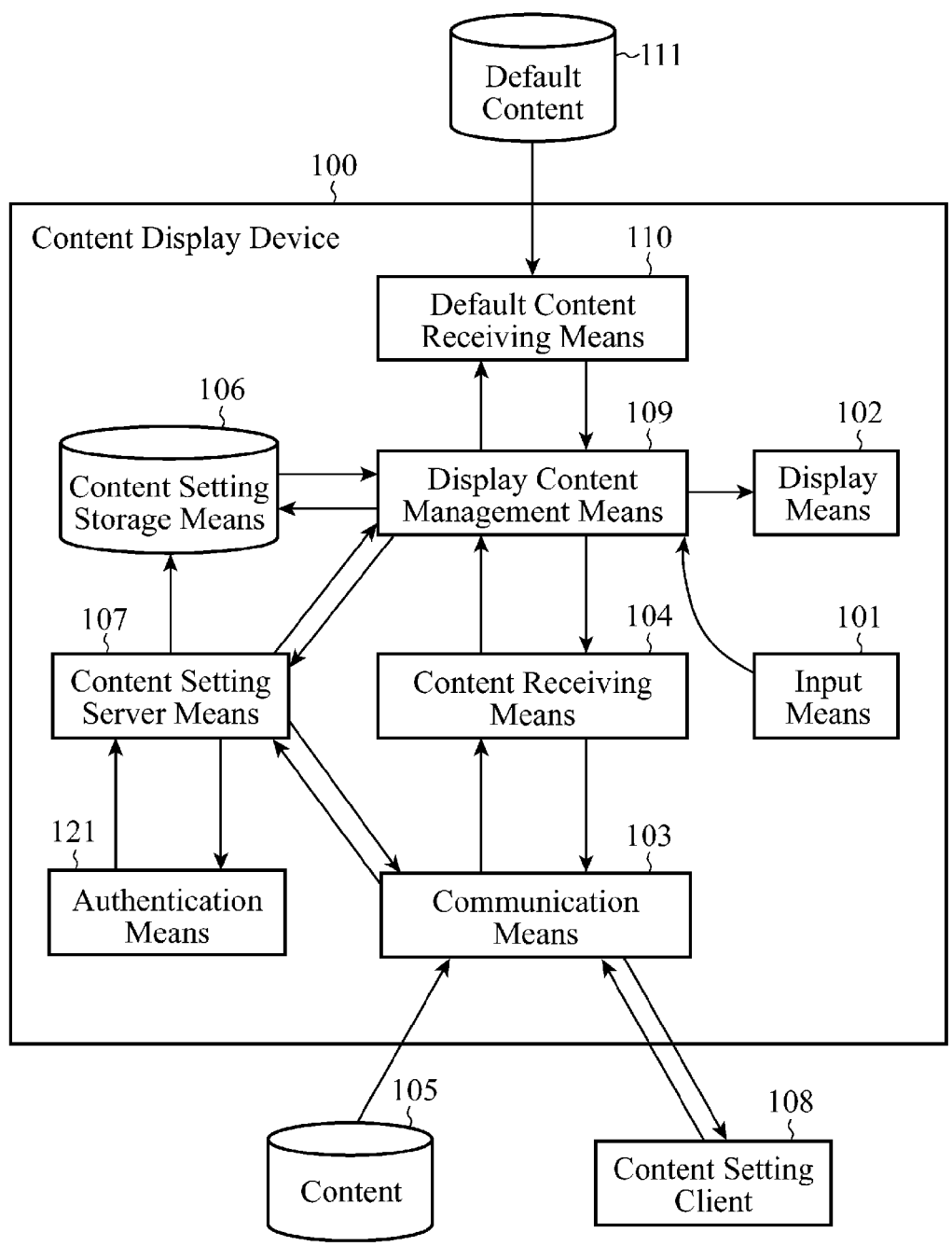
FIG. 10 is a block diagram showing the structure of a content display device in accordance with Embodiment 2 of the present invention.

FIG. 10 is a block diagram showing the configuration of a content display device in accordance with Embodiment 2 of the present invention. In the content display device in accordance with this Embodiment 2, an authentication means is added to the components of the content display device of FIG. 1. Hereafter, the same components as those of the content display device in accordance with Embodiment 1 are designated by the same reference numerals as those used in Embodiment 1, and the explanation of the components will be omitted or simplified hereafter.

The authentication means 121 issues authentication information for authenticating a content setting client 108, and authenticates or unauthenticates the content setting client 108 by using the authentication information. A communication means 103 and the content setting client 108 have a function of carrying out encrypted communications in addition to the functions shown in Embodiment 1. As an encrypting method which the communication means 103 and the content setting client 108 use, an example of using an SSL (Secure Socket Layer) will be explained hereafter. The communication means and the content setting client can be alternatively configured in such a way as to use another encrypting method.

The authentication means 121 cooperates with a content setting server means 107 so as to authenticate the content setting client 108. As an authentication method of authenticating the content setting client, HTTP Basic authentication using a password or the like can be used. Needless to say, another authentication means can be used, though in a case in which some things other than a Web server and a web browser are used as the content setting server means 107 and the content setting client 108 respectively, an authentication means suited for them needs to be used.

Figure 11:
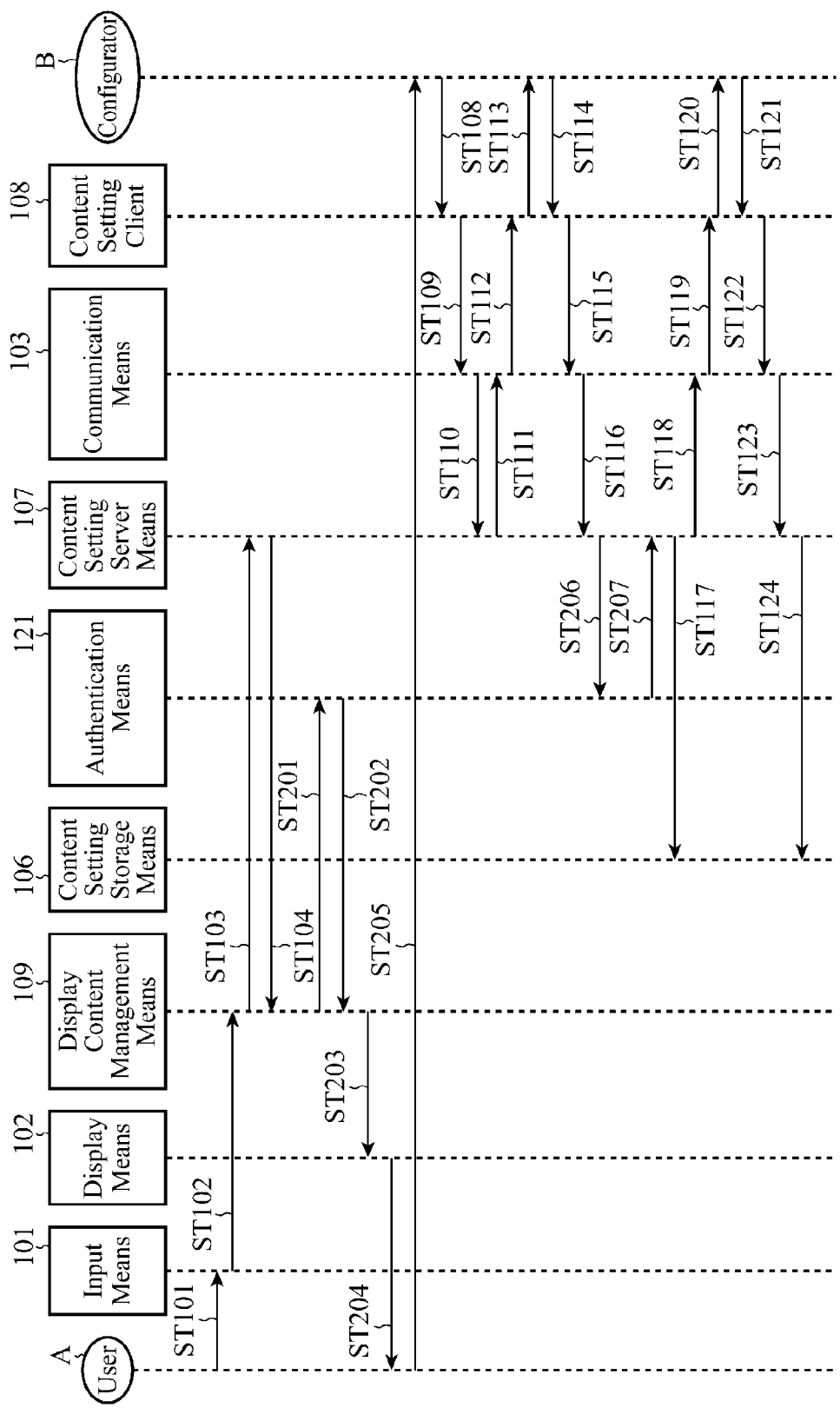
FIG. 11 is a flow chart showing the operation of the content display device in accordance with Embodiment 2 of the present invention.

Next, an operation which the content display device performs until a configurator makes a content setting to the content setting server means 107 after a user issues a content watching request to the content display device 100 will be explained with reference to a flow chart of FIG. 11. Hereafter, the same steps as those of the operation performed by the content display device in accordance with Embodiment 1 are designated by the same reference numerals as those used in FIG. 4, and the explanation of the steps will be omitted or simplified hereafter.

A user A makes a content watching request by using an input means 101 (steps ST101 and ST102). In this case, it is assumed that the channel number specified by the user is "2". Like in the case of Embodiment 1, it is assumed that any content setting which associates this request with a content has not existed yet at this time. A display content management means 109 makes a request of the content setting server means 107 for the server address (step ST103), and the content setting server means 107 sends the server address back to the display content management means (step ST104).

The display content management means 109 makes a request of the authentication means 121 for the authentication information to be displayed on a display means 102 (in this case, a password for the configurator of the channel number 2) in order to inform the authentication information to the configurator B via the user A and authenticate the configurator (step ST201). The authentication means 121 sends the password for the configurator of the channel number 2 which the authentication means has determined in advance back to the display content management means 109 (step ST202).

Figures 12, 13:
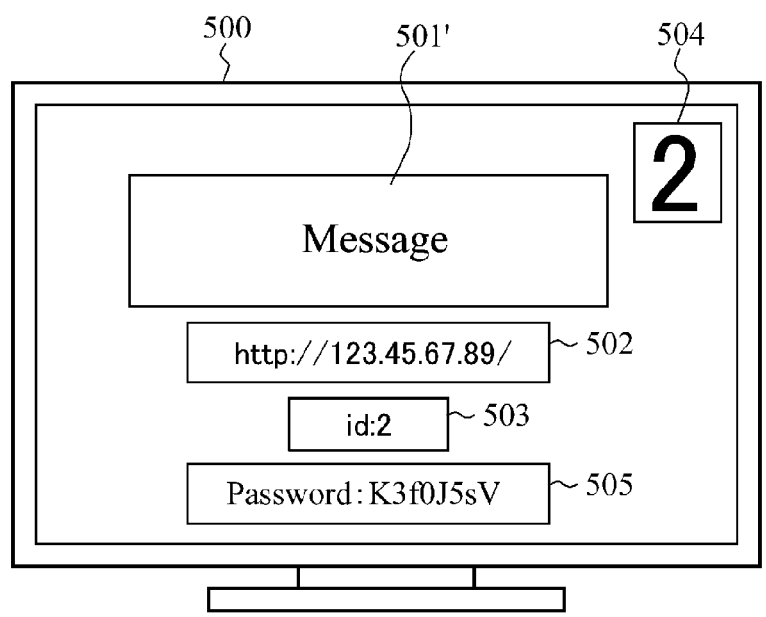
FIG. 12 is a table showing content setting information of the content display device in accordance with Embodiment 2 of the present invention.
FIG. 13 is a view showing information displayed on a display means of the content display device in accordance with Embodiment 2 of the present invention.

An example of content settings which the display content management means 109 reads from a content setting storage means 106 and the authentication means 121 is shown in FIG. 12. A channel number 201 and a channel 202 are the same items as those shown in Embodiment 1. A password 203 shows the password of the configurator B assigned to each channel, and is read by the authentication means 121. Because the writing of the nickname of the configurator B in the channel 202 is carried out after the configurator B carries out initialization, as explained in Embodiment 1, the nickname field of the channel 202 into which the nickname of the configurator B is written is blank actually in this stage.

Next, the display content management means 109 displays the server address, the configurator identification information, and the authentication information which are acquired on the display means 102 (step ST203). FIG. 13 shows an example of the display of the server address, the configurator identification information, and the authentication information on the display means 102. On the screen 500 of the display means 102, a message 501', the server address 502, the configurator identification information 503, the channel number 504, and a password 505 are displayed. For example, "Please tell your friend this address, id, and the password" or the like is displayed in the message 501'. The server address 502 has a protocol specification portion which is "https" ready for encryption. As the password 505, the password corresponding to the configurator identification information 503 is displayed.

The user A acquires the server address, the configurator identification information, and the authentication information which are displayed on the display means 102 (step ST204), and then informs them to the configurator B which the user has chosen (in this case, "Mr. Tanaka") (step ST205). Although this informing means can be the one of informing those pieces of information via voice, telephone, or the like, like in the case of Embodiment 1, it is preferable to use a safe informing means resistant to tapping and spoofing because the authentication information has to be informed to the configurator. The configurator B accesses the content setting server means 107 by using the content setting client 108, like that of Embodiment 1, so as to acquire an initial setting screen (steps ST108 to ST113).

Figure 14:
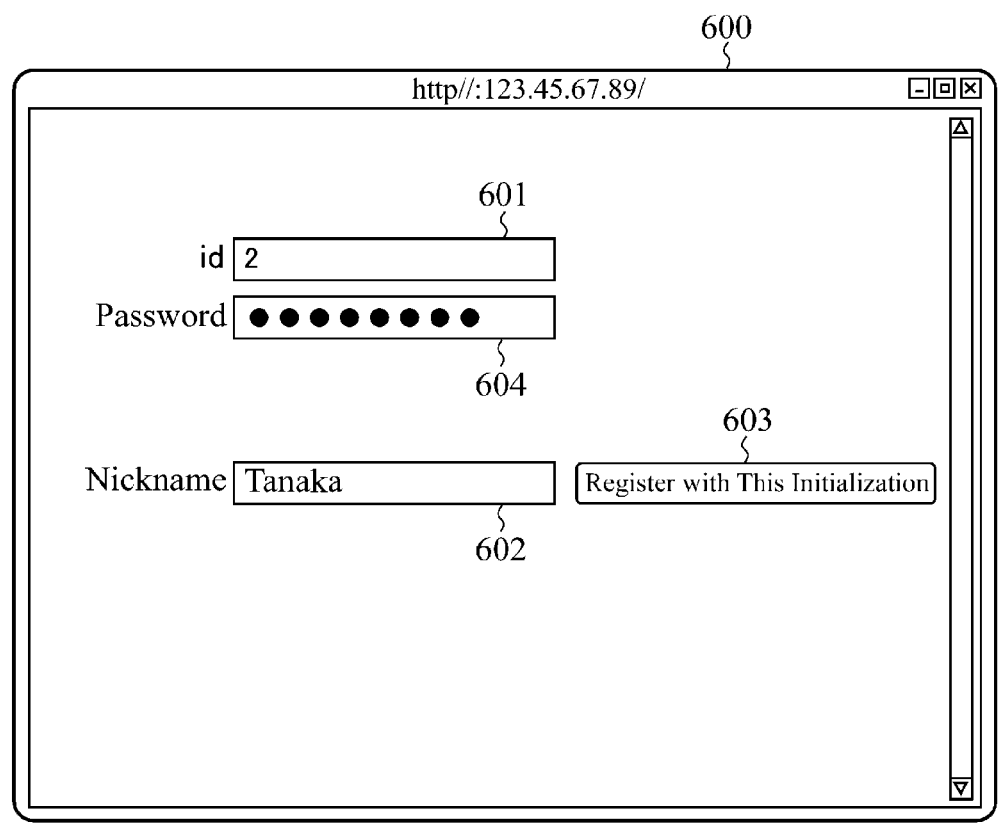
FIG. 14 is a view showing information displayed on a content setting client in accordance with Embodiment 2 of the present invention.

FIG. 14 shows an example of the initial setting screen which is displayed on the content setting client 108 in accordance with Embodiment 2. On the screen 600 of the content setting client 108, an input box 601, a nickname input box 602, a button 603, and a password input box 604 are displayed. The password input box 604 is a field to which the configurator inputs the password for authentication informed thereto from the user A. It is preferable that a mechanism of preventing leakage of the password is introduced into the password input box, e.g., expressing the character string inputted to this box as a series of symbols "●".

The configurator B inputs the configurator identification information and the authentication information, which are informed thereto, and the other information about the configurator B, such as a nickname as described in Embodiment 1, to the initial setting screen by using the content setting client 108 (step ST114), and the content setting client 108 transmits the authentication information and the initial setting information to the content setting server means 107 via the network (steps ST115 and ST116).

The content setting server means 107 presents the authentication information received thereby to the authentication means 121 so as to inquire whether or not the authentication has succeeded (step ST206). When a success of the authentication is informed to the content setting server means 107 (step ST207), the content setting server means 107 writes the initial setting information set by the configurator B in the content setting storage means 106 (step ST117). In contrast, when a failure of the authentication is informed in step ST206 (step ST207), the content setting server means informs the configurator B to that effect, returns to the process of step ST114, and makes a request to input the authentication information again.

After that, like in the case of Embodiment 1, the content setting server means 107 sends a content setting screen back to the configurator B (steps ST118 to ST120), the configurator B transmits a content setting to the content setting server means 107 (steps ST121 to ST123), and the content setting server means 107 writes the content setting in the content setting storage means 106 (step ST124).

The above-mentioned communications of steps ST109, ST112, ST115, ST119, and ST122 are encrypted by the encryption communication function which the content setting client 108 and the communication means 103 have.

As mentioned above, because the content display device in accordance with this Embodiment 2 is configured in such a way as to have the authentication means 121 for issuing authentication information about the authentication of the content setting client 108, and also authenticating the content setting client 108, the content display device enables the user to authenticate a configurator by informing the authentication information to the configurator, and can prevent spoofing of a configurator and enables the user to cause a configurator to make a content setting more safely.

Furthermore, because the content display device in accordance with this Embodiment 2 is configured in such a way that the communication means 103 and the content setting client 108 have the function of carrying out encrypted communications, the content display device can encrypt and carry out communications of an initial setting and a content setting made by a configurator. Therefore, the content display device can prevent tapping and spoofing at the time of authentication, can further cause a configurator to make a content setting safely, and can also conceal the content setting from outsiders and protect the privacy of the user.

Embodiment 3

Figure 15:
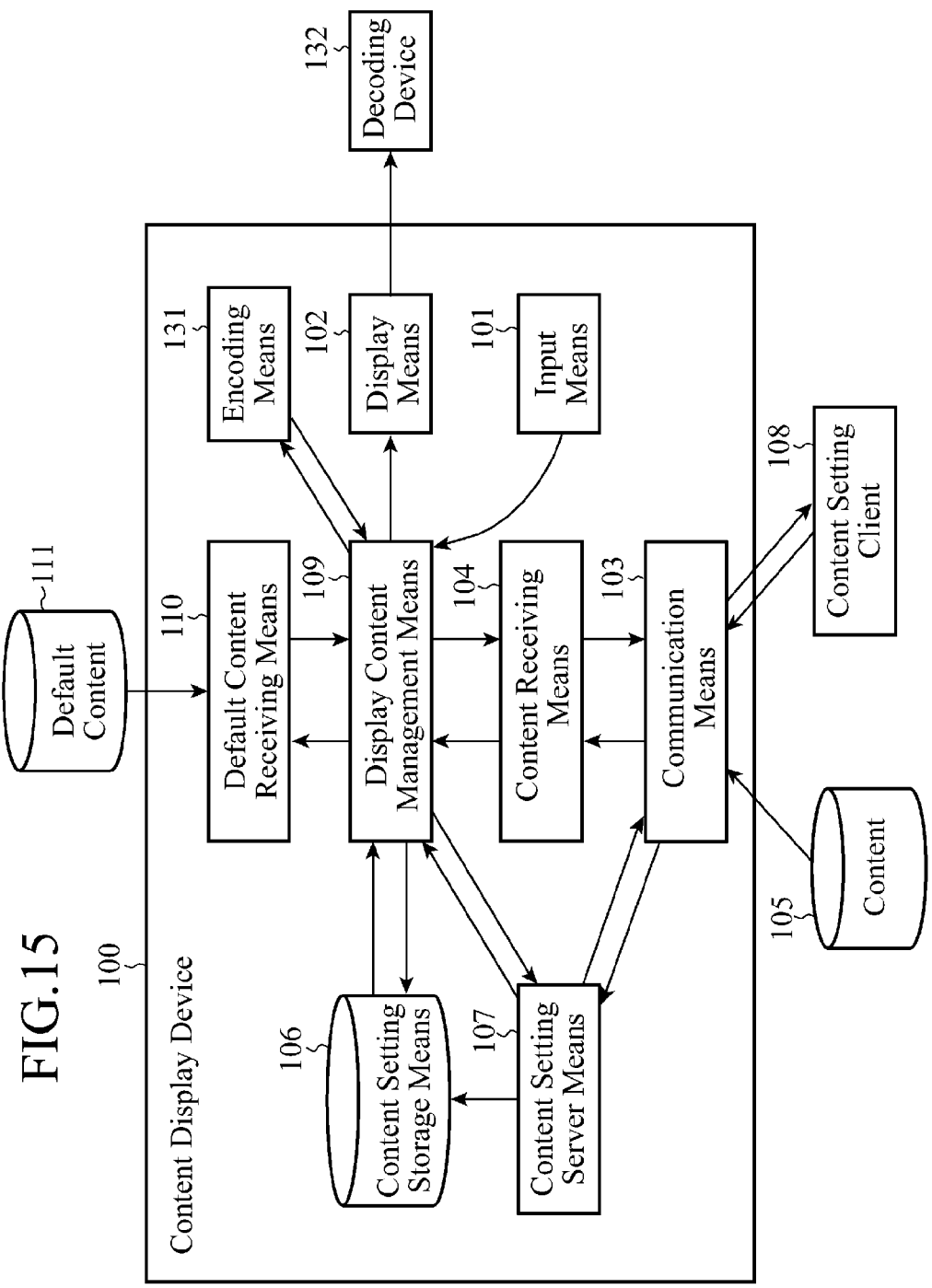
FIG. 15 is a block diagram showing the structure of a content display device in accordance with Embodiment 3 of the present invention.

FIG. 15 is a block diagram showing the configuration of a content display device in accordance with Embodiment 3 of the present invention. In the content display device in accordance with this Embodiment 3, an encoding means is added to the components of the content display device of FIG. 1, and a decoding device is further added as an external device. Hereafter, the same components as those of the content display device in accordance with Embodiment 1 are designated by the same reference numerals as those used in Embodiment 1, and the explanation of the components will be omitted or simplified hereafter. The encoding means can be added to the content display device 100 in accordance with Embodiment 2, and the decoding means can be added to the content display device 100 in accordance with Embodiment 2 as an external device.

The encoding means 131 encodes the address of a content setting server means 107 and identification information about a content setting client 108 which are displayed on a display means 102. The decoding device 132 decodes the pieces of information encoded by the encoding means 131.

A case in which the encoding means 131 uses a two-dimensional bar code, such as a QR code, as a method of encoding the server address of the content setting server means 107 and the configurator identification information about the content setting client 108 will be explained as an example. As an alternative, the encoding means can use another encoding method. For example, the encoding means can use a method of encoding the server address of the content setting server means 107 and the configurator identification information about the content setting client 108 into katakana characters to display these katakana characters. The encoding means can alternatively use a method of encoding the server address of the content setting server means and the configurator identification information about the content setting client into voice information to present this voice information to the user. This case of encoding the server address of the content setting server means and the configurator identification information about the content setting client into voice information differs from the above-mentioned cases in that the encoding means provides the information for a speaker (not shown) instead of the display unit 102.

It is assumed that the decoding device 132 is a mobile phone which supports QR codes. Needless to say, another QR code reader can be used. In a case in which the encoding means 131 encodes the server address and the configurator identification information into something other than a QR code, the decoding device 132 is adapted to the encoding means 131. In a case in which the encoding means encodes the server address and the configurator identification information into katakana characters or voice information, the decoding device is not needed, unlike in the case of encoding them into a QR code.

Figure 16:
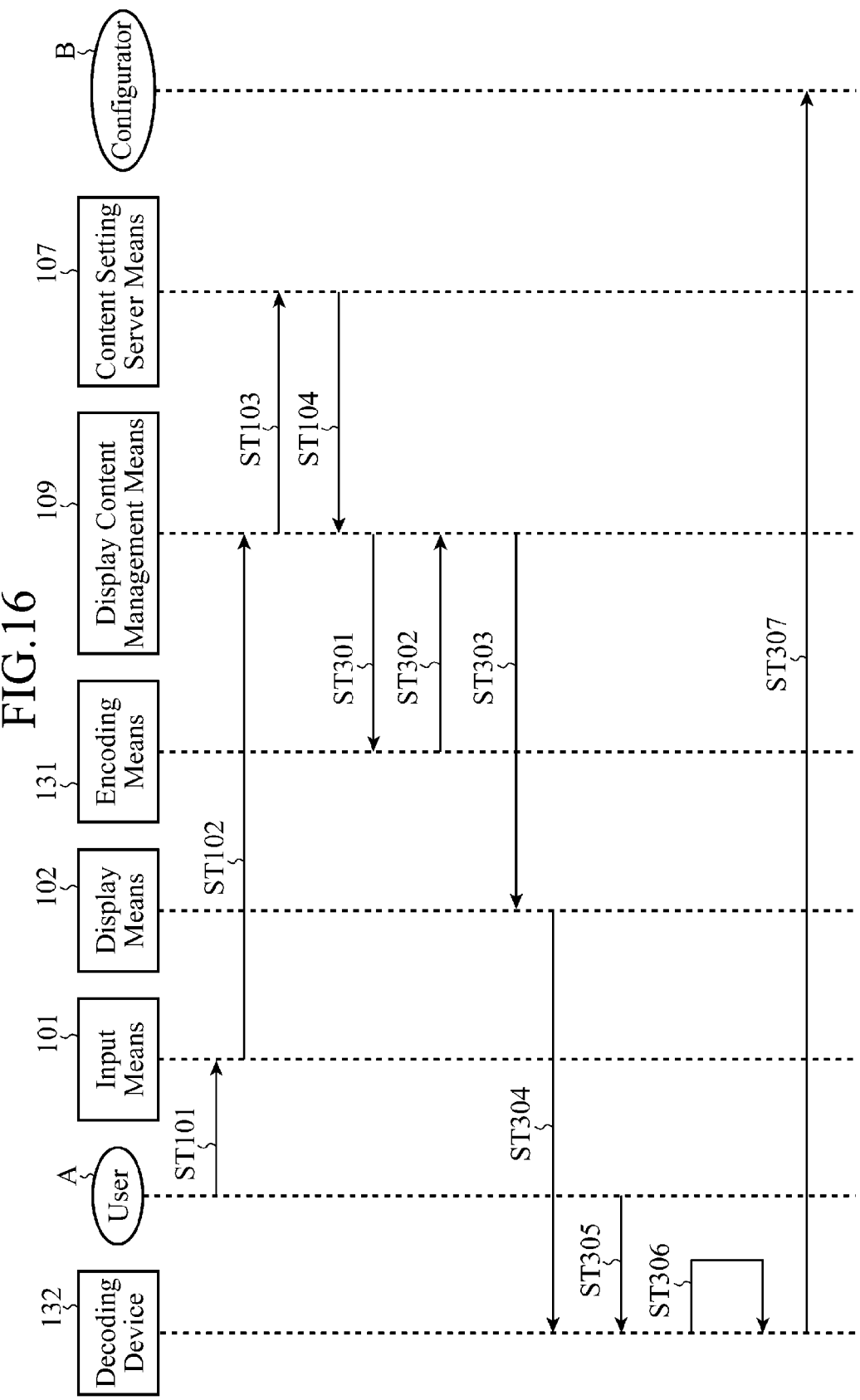
FIG. 16 is a flow chart showing the operation of the content display device in accordance with Embodiment 3 of the present invention.

Next, an operation which the content display device performs until the content display device informs the server address and the configurator identification information to a configurator after the user issues a content watching request to the content display device 100 will be explained with reference to a flow chart of FIG. 16. Hereafter, the same steps as those of the operation performed by the content display device in accordance with Embodiment 1 are designated by the same reference numerals as those used in FIG. 4, and the explanation of the steps will be omitted or simplified.

A user A makes a content watching request by using an input means 101 (steps ST101 and ST102). In this case, it is assumed that the channel number specified by the user is "2". Like in the case of Embodiment 1, it is assumed that any content setting which associates this request with a content has not existed yet at this time. A display content management means 109 makes a request of the content setting server means 107 for the server address (step ST103), and the content setting server means 107 sends the server address back to the display content management means (step ST104).

The display content management means 109 makes a request of the encoding means 131 to encode the server address and the configurator identification information into a QR code (step ST301). The encode means 131 creates a QR code and sends the QR code back to the display content management means 109 (step ST302). The display content management means 109 displays the acquired QR code on the display means 102 (step ST303), and the user A causes the decoding device 132 to read the displayed QR code (step ST304).

Figure 17:
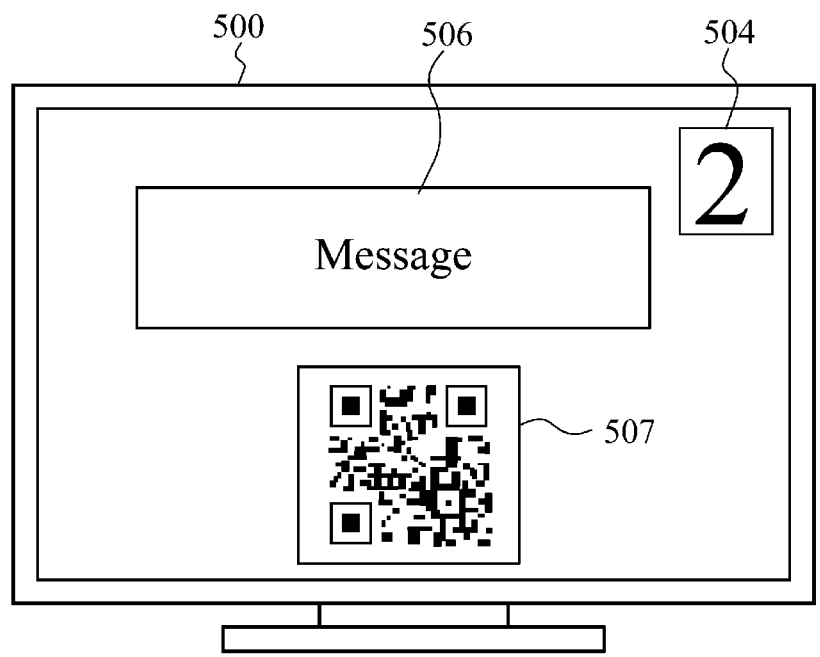
FIG. 17 is a view showing information displayed on a display means of the content display device in accordance with Embodiment 3 of the present invention.

FIG. 17 shows an example of the display of the QR code on the display means 102. A message 506 and the QR code 507 are displayed on the screen 500 of the display means 102. For example, "Please read the code displayed below and send this code to your friend" or the like is displayed in the message 506. The QR code 507 is information obtained by encoding, for example, "http://123.45.67.89/" and "id:2".

The user A issues a request to decode the QR code to the decoding device 132 (step ST305), and the decoding device 132 decodes the QR code (step ST306) and informs the server address and the configurator identification information to the configurator B which the user A has chosen (step ST307). Although a method of informing the server address and the configurator identification information to the configurator can be the method of informing them via voice, telephone, facsimile, mail, or e-mail, as described in Embodiment 1, the use of a method of using a mobile phone as the decoding device 132 for decoding the QR code, and informing the server address and the configurator identification information to the configurator using the electronic mail function of the mobile phone is easy and recommended because the content display device can inform the decoded results to the configurator without making the user A read the decoded results. Also in the case in which encoding and decoding methods and an informing means using something other than a QR code are used, the use of a method of being able to inform the decoded results obtained by the decoding device 132 directly to the configurator B without making the user A read the decoded results is recommended.

Because up to an operation which will be performed by the content display device until the user starts watching a content is the same as that performed in steps ST108 to ST139 shown in Embodiment 1, the explanation of the operation will be omitted hereafter. In the case of encoding the server address and the configurator identification information into katakana characters or voice information, the content display device, in steps ST304 to ST306, carries out a process of presenting the katakana characters or voice information directly to the user A to cause the user A to interpret (decode) the katakana characters or voice information, instead of the process of presenting the QR code to the decoding device 132 to cause this decoding device to decode the QR code. A process of informing information acquired by interpreting the katakana characters or voice information to the configurator B is the same as that of step ST107 shown in Embodiment 1.

As mentioned above, because the content display device in accordance with this Embodiment 3 is configured in such a way as to have the encoding means 131 for encoding the server address and the configurator identification information, and cause the user side to decode the encoded information to enable the user to directly acquire the server address and the configurator identification information, the content display device can inform pieces of hard-to-read information including the server address and the configurator identification information directly to each configurator without making the user read the pieces of hard-to-read information.

In above-mentioned Embodiment 3, the case in which the user has the decoding device, causes this decoding device to carry out the decoding process of decoding encoded information to generate the server address and the configurator identification information, and informs these pieces of information to the configurator is shown. As an alternative, the configurator can have the decoding device, and can cause the decoding device to carry out the decoding process. In this case, the user does not have to have the decoding device, and informs the encoded information, such as a QR code displayed, directly to the configurator B. In the case of using a QR code, the user takes a photo of the QR code and transmits this photo to the configurator via mail or e-mail.

Embodiment 4

Figure 18:
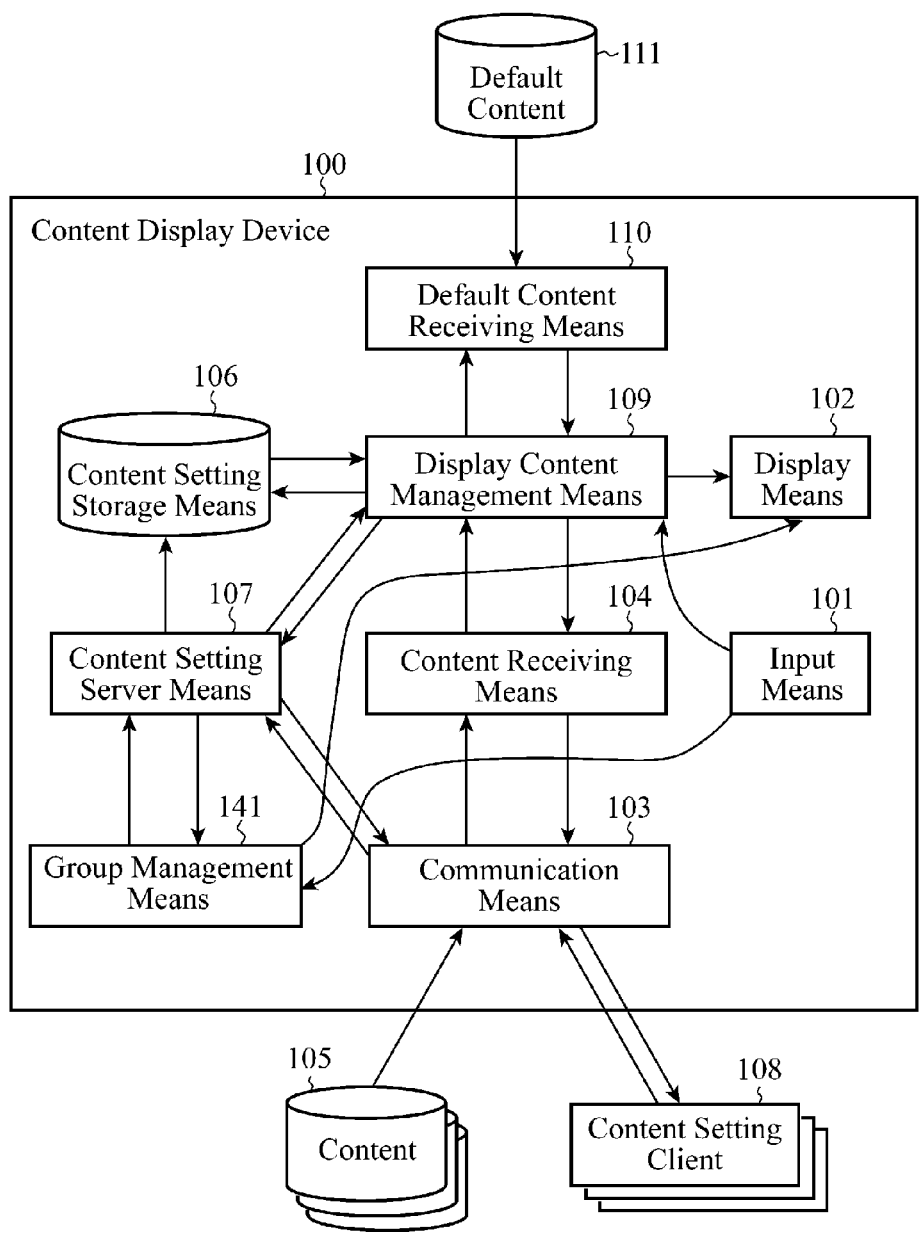
FIG. 18 is a block diagram showing the structure of a content display device in accordance with Embodiment 4 of the present invention.

FIG. 18 is a block diagram showing the configuration of a content display device in accordance with Embodiment 4 of the present invention. In the content display device in accordance with this Embodiment 4, a group management means is added to the components of the content display device shown in FIG. 1. Hereafter, the same components as those of the content display device in accordance with Embodiment 1 are designated by the same reference numerals as those used in Embodiment 1, and the explanation of the components will be omitted or simplified hereafter. This group management means can be added to the components of the content display device 100 in accordance with any one of Embodiments 2 and 3.

The group management means 141 carries out group management for communications, via a content setting server means 107, between configurators and between the user and each of the configurators. This group management includes restrictions on communications between configurators belonging to different groups respectively. As communication functions, there are provided a function of browsing setting information set by another configurator and watching a content set by the other configurator, a chat function, a TV telephone function, a function of making a comment on a content, a function of browsing a content currently being watched, and a function of determining taste information to disclose this taste information. Needless to say, the communication functions can include another communication function. In this Embodiment 4, a group refers to a gathering of configurators which can communicate with one another by using the above-mentioned communication functions.

FIG. 19 is a table showing a group management setting made by the group management means 141. The group management setting table is comprised of sets of a group name 401 showing a group's name and configurators 402 belonging to the group. It can be seen from this group management setting table that a group "company" includes the following three configurators: "Mr. Tanaka", "Mr. Sato", and "Mr. Yamada", and a group "sandlot baseball team" includes the following two configurators: "Mr. Takahashi" and "Mr. Sato". In this group management setting table, "Mr. Sato" belongs to both the groups.

Figure 20:
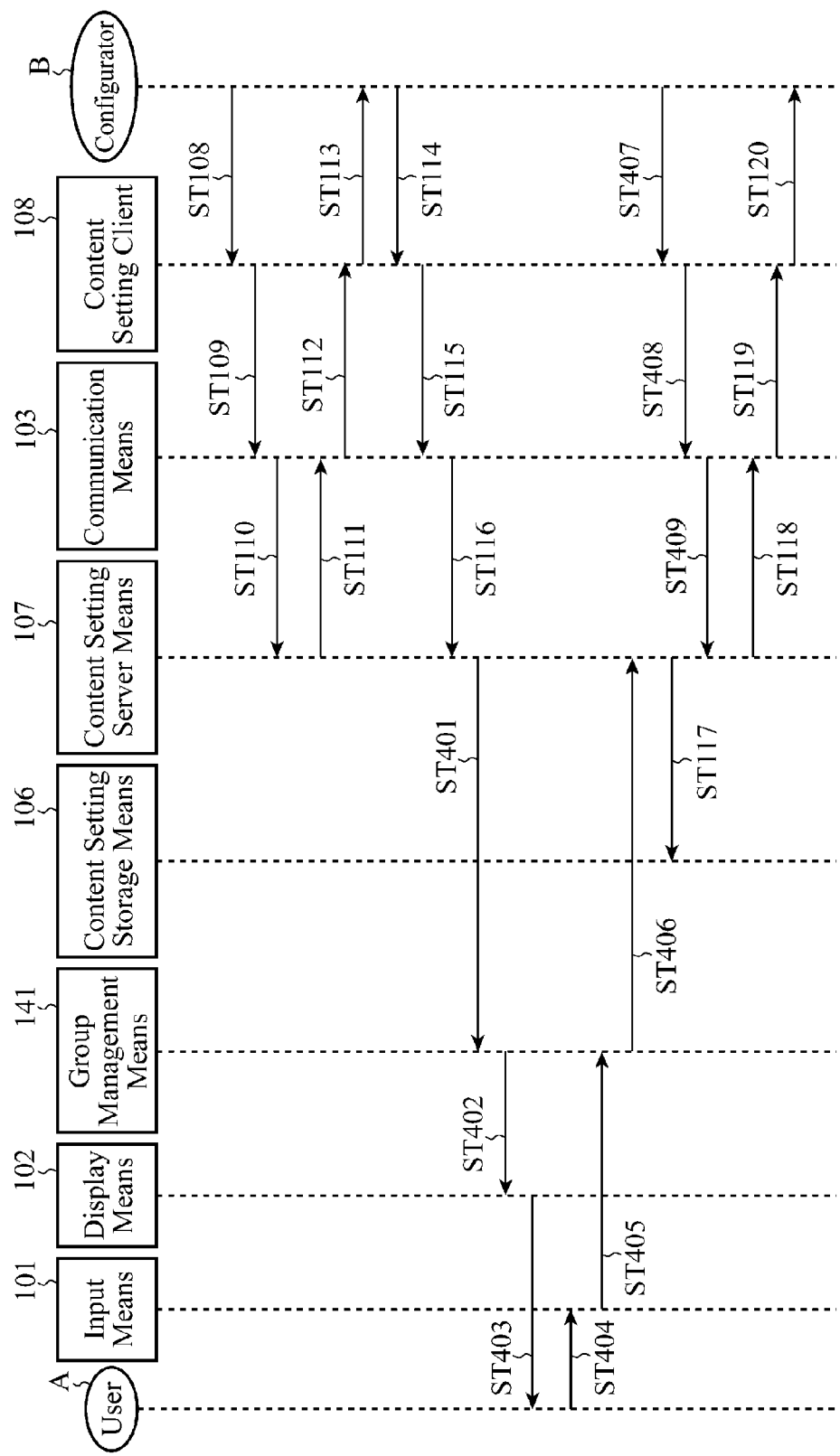
FIG. 20 is a flow chart showing the operation of the content display device in accordance with Embodiment 4 of the present invention.

Next, an operation which the content display device performs until the content display device writes initial setting information about a configurator including grouping information into a content setting storage means 106 after a user informs a server address and configurator identification information to the configurator will be explained with reference to a flow chart of FIG. 20. Hereafter, the same steps as those of the operation performed by the content display device in accordance with Embodiment 1 are designated by the same reference numerals as those used in FIG. 4, and the explanation of the steps will be omitted or simplified hereafter.

First, like insteps ST101 to ST107 of the Embodiment 1, the user A makes a content watching request via an input means 101 so as to acquire the server address and the configurator identification information via a display means 102, and then informs them to the configurator B. In addition, like in steps ST108 to ST113, the configurator B accesses a content setting server means 107 by using a content setting client 108 so as to acquire an initial setting screen.

Figure 21:
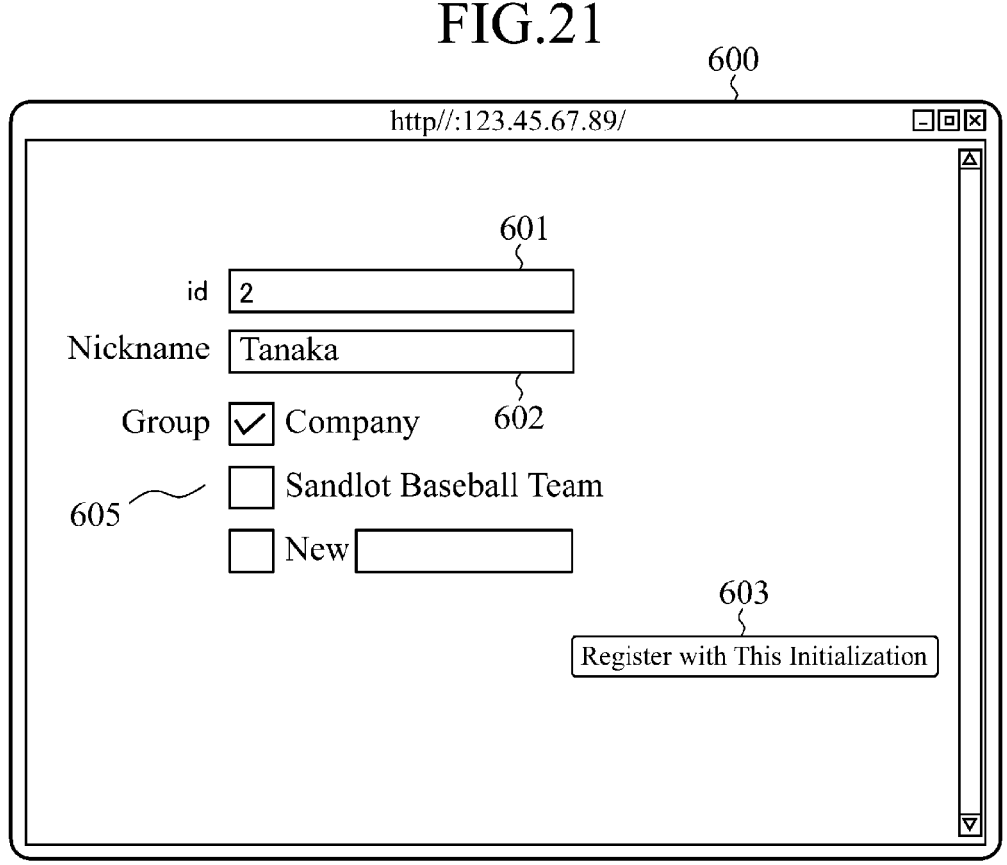
FIG. 21 is a view showing information displayed on a content setting client in accordance with Embodiment 4 of the present invention.

FIG. 21 shows an example of the initial setting screen which is displayed on the content setting client 108 in accordance with Embodiment 4. On the screen 600 of the content setting client 108, an input box 601, a nickname input box 602, a button 603, and group specification boxes 605 are displayed. The group specification boxes 605 are fields with which the configurator B specifies a group to which the configurator should belong, and can select an existing group name, and to which the configurator input a new group name. When a group to which the configurator B itself should belong already exists, the configurator B selects it, or otherwise the configurator B newly inputs a group name to the group specification box. Although the example in which the configurator selects the group "company" is shown in FIG. 21, the configurator can alternatively select both the "company" and the "sandlot baseball team", and each configurator is allowed to belong to a plurality of groups.

The configurator B inputs the group name, the configurator identification information informed thereto, and other information about the configurator, such as a nickname, to the initial setting screen by using the content setting client 108 (step ST114). The content setting client 108 transmits the group setting and the initial setting information to the content setting server means 107 via a communication means 103 (steps ST115 and ST116). The content setting server means 107 transmits the group setting made by the configurator B to the group management means 141 (step ST401). The group management means 141 displays a group setting grant request on the display means 102 in order to inquire of the user A whether or not the group setting is appropriate (steps ST402 and ST403).

Figure 22:
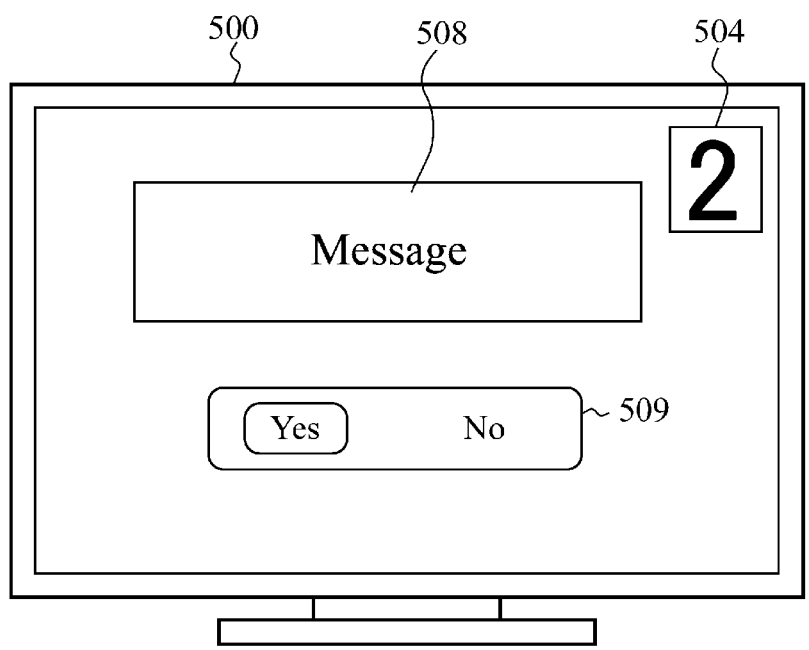
FIG. 22 is a view showing information displayed on a display means of the content display device in accordance with Embodiment 4 of the present invention.

FIG. 22 shows an example of the display of the group setting grant request on the display means 102. On the screen 500 of the display means 102, a message 508 and a button 509 for enabling the user A to select grant or denial by using the input means 101 are displayed. For example, ""Mr. Tanaka" has registered into the "company" group for this channel. Do you grant this registration?" or the like is displayed in the message 508.

In the example of FIG. 22, when the user grants the registration of the configurator "Mr. Tanaka", the guarantee that the configurator is a user intended one depends upon only the configurator identification information which the user A has informed to the configurator and the nickname (in this case, "Tanaka") which the configurator itself has set. However, the content display device can be configured in such a way as to strengthen the guarantee that the configurator is a user intended one by using the authentication means 121 and encryption communications which are shown in Embodiment 2.

When the user A grants this group setting via the input means 101 (steps ST404 and ST405), the group management means 141 updates the group settings managed thereby, and outputs a notification of group grant to the content setting server means 107 (step ST406). When the group management means 141 performs an update of the group settings, the group management means writes the group name set in the group specification box 605 (refer to FIG. 21) in a group name 401 of the table shown in FIG. 19, and also writes the nickname of the configurator set to the nickname input box 602 (refer to FIG. 21) in a corresponding configurator 402 of the table.

The content setting server means 107 to which the notification of group grant is inputted in step ST406 writes the initial setting information in the content storing means 106 (step ST117). After that, the configurator B accesses the content setting server means 107 via the content setting client 108 and the communication means 103 again (steps ST407 to ST409) so as to acquire a setting screen (steps ST118 to ST120). Because the subsequent operation is the same as that performed in steps ST121 to ST139 shown in Embodiment 1, the explanation of the operation will be omitted hereafter.

Figure 23:
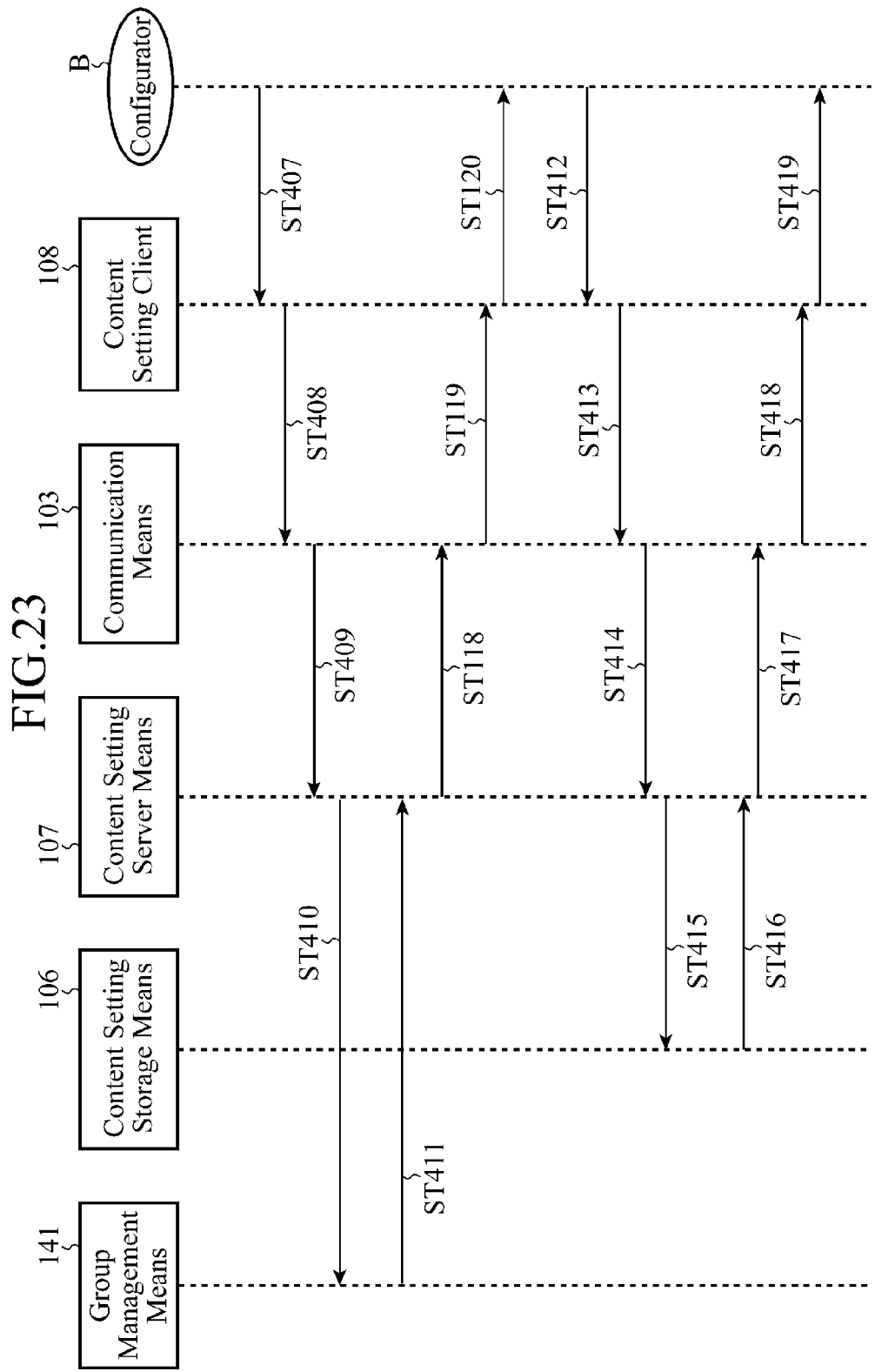
FIG. 23 is a flow chart showing the operation of the content display device in accordance with Embodiment 4 of the present invention.

Next, an operation which is performed by the content display device when a configurator browses setting information set by another configurator will be explained as an example of communications between the configurators via the content setting server means 107 with reference to a flow chart of FIG. 23. FIG. 23 shows an operation which is performed by the content display device until a configurator browses content setting information set by another configurator after the configurator makes a request of the content setting server means 107 for a setting screen. Hereafter, the same steps as those of the operation performed by the content display device in accordance with Embodiment 1 are designated by the same reference numerals as those used in FIG. 4 and the same steps as those of the operation performed by the content display device in accordance with Embodiment 4 are designated by the same reference numerals as those used in FIG. 20, and the explanation of those steps will be omitted or simplified hereafter.

A configurator B makes a request of the content setting server means 107 via the content setting client 108 and the communication means 103 for a setting screen (steps ST407 and ST409). The content setting server means 107 to which the setting screen request has been inputted makes a request of the group management means 141 for the list of group members of the group to which the configurator B belongs (step ST410). The group management means 141 sends the list of group members of the group to which the configurator B belongs back to the content setting server means 107 (step ST411). The content setting server means 107 constructs a setting screen on the basis of the list, and sends the setting screen back to the configurator (steps ST118 to ST120).

Figure 24:
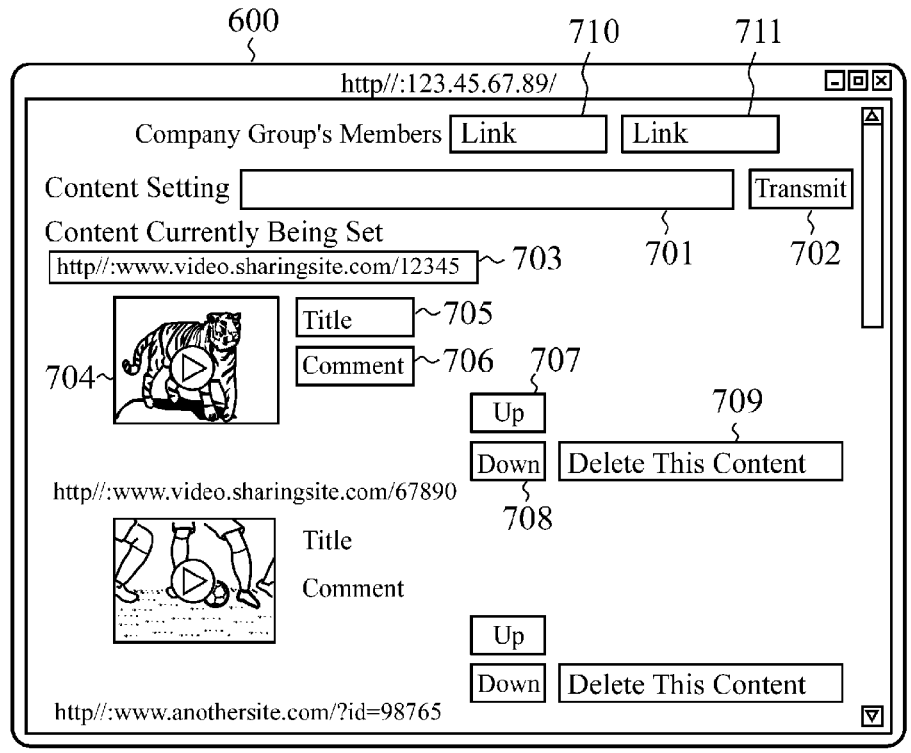
FIG. 24 is a view showing information displayed on the content setting client in accordance with Embodiment 4 of the present invention.

FIG. 24 shows an example of the setting screen which is displayed on the content setting client 108. On the screen 600 of the content setting client 108, a content setting box 701, a button 702, an address 703, a preview screen 704, a title 705, a comment 706, buttons 707, 708, and 709, and links 710 and 711 showing content browsing pages which are set by the group members of the group to which the configurator belongs are displayed. For example, in these links 710 and 711, "View Mr. Sato's settings" and "View Mr. Yamada's settings" are displayed respectively.

The configurator B makes a request of the content setting server means 107 via the content setting client 108 and the communication means 103 for a link for browsing of contents set by another configurator (steps ST412 to ST414). Hereafter, an explanation will be made assuming that the configurator B makes a request of the content setting server means for the link for browsing of the contents set by "Mr. Sato". The content setting server means 107 inquires of the content setting storage means 106 about Mr. Sato's content settings (step ST415). The content setting storage means 106 sends Mr. Sato's content settings back to the content setting server means 107 (step ST416). On the basis of the content settings, the content setting server means 107 sends the page for other configurator content browsing via the communication means 103 and the content setting client 108 back to the configurator B (steps ST417 to step ST419). The content display device can be configured in such a way as to strengthen the guarantee that the other configurator content browsing request is a one intended by the configurator B also in this processing by using the authentication means 121 and encryption communications which are shown in Embodiment 2.

Figure 25:
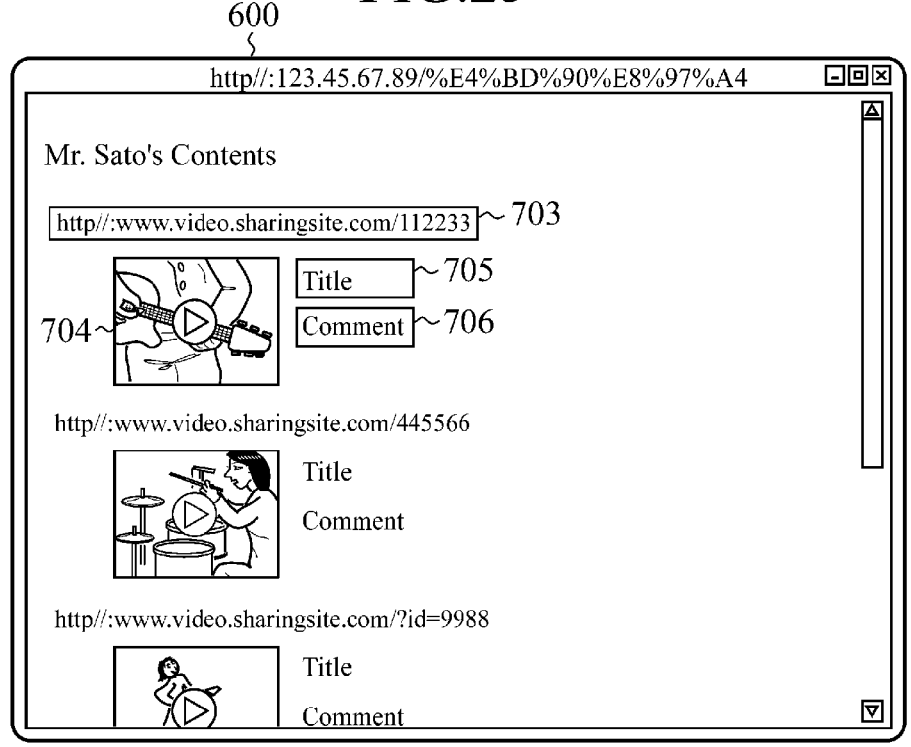
FIG. 25 is a view showing information displayed on the content setting client in accordance with Embodiment 4 of the present invention.

FIG. 25 shows an example of the screen of the page for other configurator content browsing which is displayed on the content setting client 108. On the screen 600 of the content setting client 108, an address 703, a preview screen 704, a title 705, and a comment 706 are displayed in the page for other configurator browsing. It is preferable that the content display device is configured in such a way that the configurator B can watch a content easily by clicking the address 703 or the preview screen 704.

As mentioned above, because the content display device in accordance with this Embodiment 4 is configured in such a way as to have the group management means 141 for enabling communications between configurators and between the user and a configurator, and allow each configurator to make a group setting and also allow the user to determine whether to grant the group setting, the content display device can group the configurators safely and easily. As a result, the content display device makes it possible for groups, such as a "company coworker group" and a "sandlot baseball team", to share contents, and can use safely and easily a private communication function of each group via the content setting server means.

Embodiment 5

Figure 26:
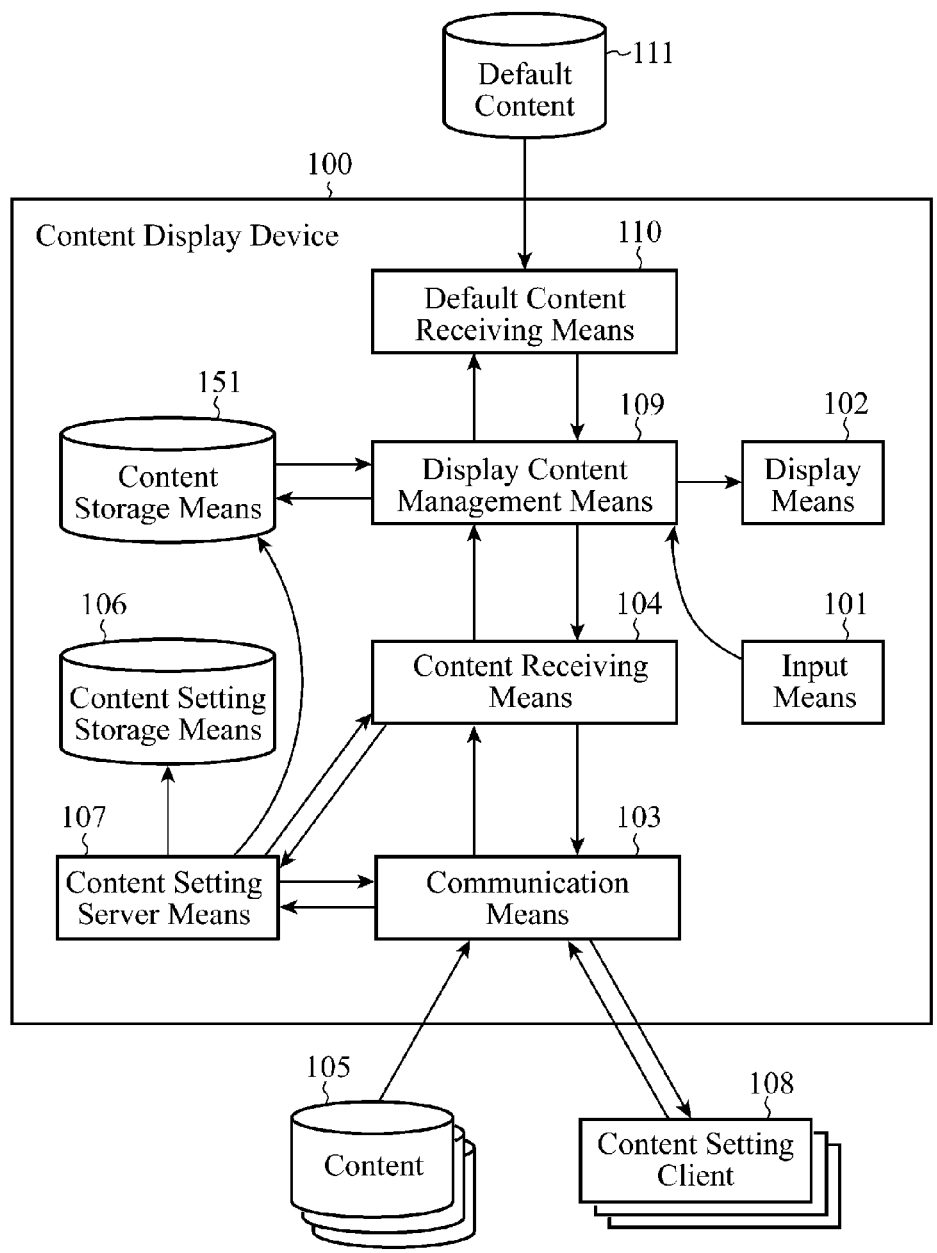
FIG. 26 is a block diagram showing the structure of a content display device in accordance with Embodiment 5 of the present invention.

FIG. 26 is a block diagram showing the configuration of a content display device in accordance with Embodiment 5 of the present invention. In the content display device in accordance with this Embodiment 5, a content storage means is added to the components of the content display device shown in FIG. 1. Hereafter, the same components as those of the content display device in accordance with Embodiment 1 are designated by the same reference numerals as those used in Embodiment 1, and the explanation of the components will be omitted or simplified. The content storage means can be added to the components of the content display device 100 in accordance with any one of Embodiments 2 to 4.

The content storage means 151 stores contents 105 on a set-up network therein, enables a content setting client 108 to upload its contents thereto, or performs both the storing and the enabling. The content storage means 151 is comprised of a device that can receive the substance of a content from a content setting server means 107, and can store the content therein, e.g., an HDD (Hard Disk Drive) device. Needless to say, the content storage means can be constructed using a data storage device different from an HDD device. Furthermore, a content which each configurator itself has is a content file existing on a PC in which the content setting client 108 exists. In this Embodiment 5, a case in which the content storage means 151 can store contents on a set-up network therein, and enables each configurator to upload a content which each configurator itself has thereto will be explained.

First, an operation which is performed by the content display device 100 when a configurator uploads a content which the configurator itself has to the content display device will be explained. An operation which is performed by the content display device until a configurator uploads a content which the configurator itself has to the content display device after the configurator makes an initial setting to the content setting server means 107 will be explained with reference to a flow chart of FIG. 27. Hereafter, the same steps as those of the operation performed by the content display device in accordance with Embodiment 1 are designated by the same reference numerals as those used in FIG. 4, and the explanation of the steps will be omitted or simplified hereafter.

A user A issues a content watching request to the content display device 100, and then acquires the address of the content setting server means 107 and configurator identification information and informs them to a configurator B. The configurator B which has received the notification carries out initialization by using the content setting client 108. Because this operation is the same as that performed in steps ST101 to ST117 of Embodiment 1, the explanation of the operation will be omitted hereafter.

The configurator B makes a request of the content setting server means 107 via the content setting client 108 and a communication means 103 for a setting screen (steps ST501 and ST503). The content setting server means 107 which has received the request sends the setting screen back to the configurator B via the communication means 103 and the content setting client 108 (steps ST118 to ST120).

Figure 28:
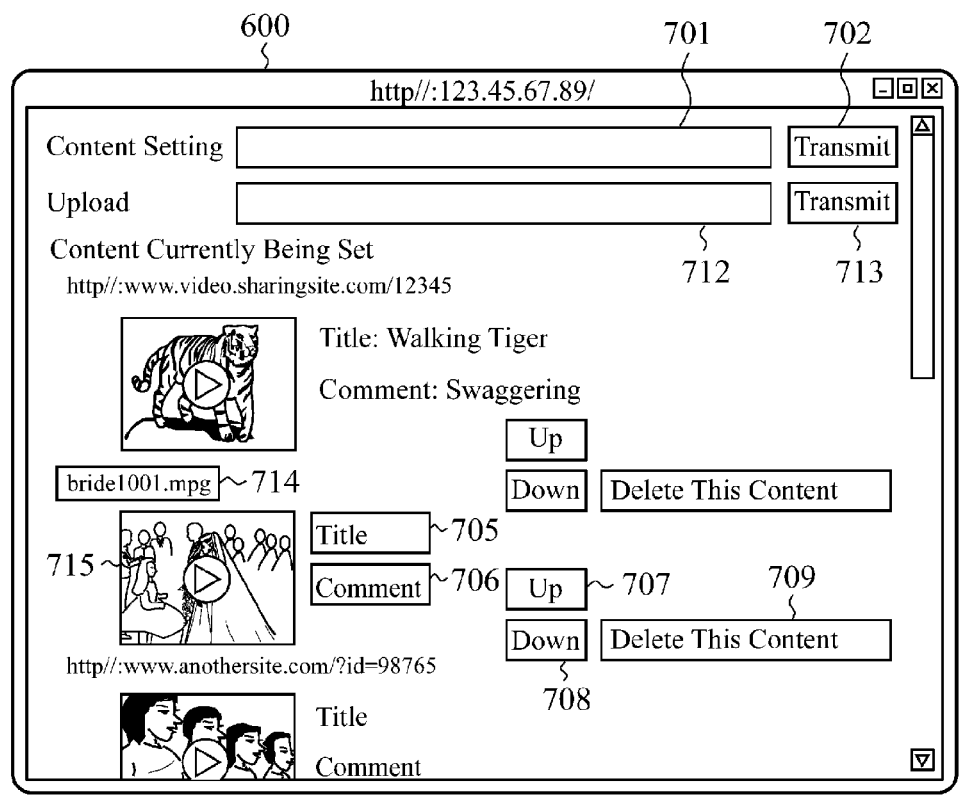
FIG. 28 is a view showing information displayed on a content setting client in accordance with Embodiment 5 of the present invention.

FIG. 28 shows an example of the setting screen which is displayed on the content setting client 108. On the screen 600 of the content setting client 108, a content setting box 701, a button 702, a title 705, a comment 706, buttons 707, 708, and 709, a content input box 712 in which the configurator B specifies a content which the configurator itself has, a button 713 for uploading a content specified in the content input box 712, a filename 714 of a content already uploaded in the past and currently being set, and a preview image 715 of the content having the filename 714 are displayed. A previous setting can be edited by using the title 705, the comment 706, and the buttons 707 and 708, like in the case of Embodiment 1.

The configurator B specifies a contents file which the configurator itself has in the content input box 712, and then pushes the button 713 (step ST504). The content setting client 108 uploads the content (step ST505), and transmits the content to the content setting means 107 via the communication means 103 (step ST506). The content setting server means 107 which has received the content in step ST506 writes the content setting in the content setting storage means 106 (step ST124), and also stores the uploaded file in the content storage means 151 (step ST507). The content display device can be configured in such a way as to, after that, inform that the setting has been made to the user A, like that of Embodiment 1 (steps ST125 to ST127).

The user A issues a content watching request to the display content management means 109 (steps ST128 and ST129). A display content management means 109 makes a request of the content setting storage means 106 for the address of the specified content described in a content 302 (step ST130), and the content setting storage means 106 sends the address of the specified content back to the display content management means (step ST131). When the address of the specified content sent thereto shows the uploaded content, the display content management means 109 makes a request of the content storage means 151 to send the content on the basis of the address of the specified content (step ST508). The content storage means 151 which has received the request sends the substance of the content back to the display content management means 109 (step ST509). The display content management means 109 displays the substance of the content on a display means 102 (step ST138), and the user A watches the content (step ST139). By performing the above-mentioned operation, the content display device enables the user A to specify the channel number so as to watch the content which the configurator B has uploaded. The content display device performs the display of the content when the user is watching the content in the same way that that in accordance with Embodiment 1 does.

By repeatedly performing the processes of steps ST501 to ST506, and ST120 to ST124 even after the above-mentioned sequence, the content display device enables the configurator B to add or edit a content setting as needed, or upload a content. Furthermore, like in the case of Embodiment 1, by performing the processes of steps ST128 to ST139, the content display device enables the user A to watch the content properly.

Figure 29:
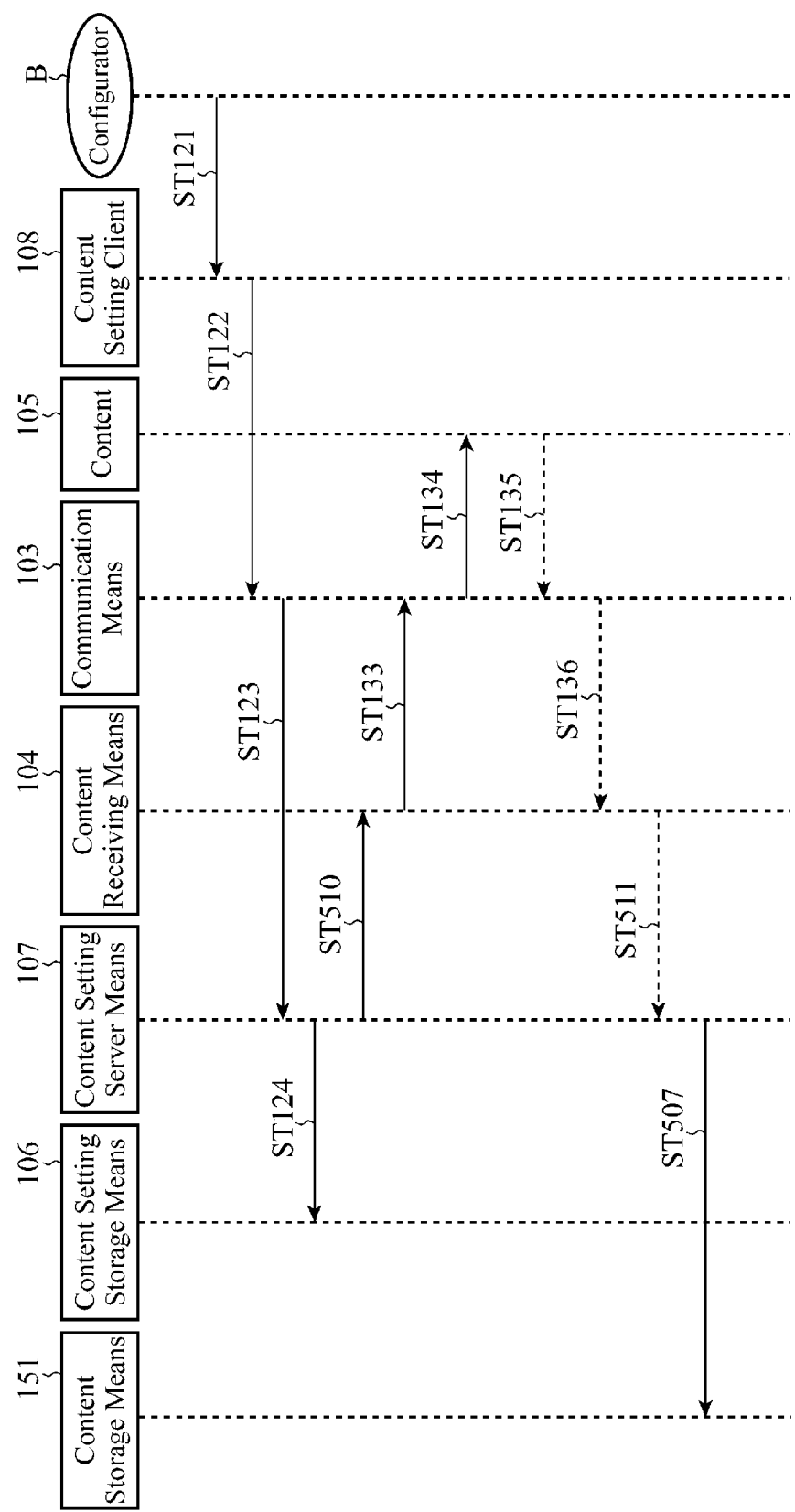
FIG. 29 is a flow chart showing the operation of the content display device in accordance with Embodiment 5 of the present invention.

Next, an operation which is performed by the content display device 100 when storing a content on the set-up network will be explained. An operation which is performed by the content display device until the content setting server means 107 stores a content on the set-up network after a configurator makes an initial setting to the content setting server means 107 will be explained with reference to a flow chart of FIG. 29. Hereafter, the same steps as those of the operation performed by the content display device in accordance with Embodiment 1 are designated by the same reference numerals as those used in FIG. 4 and the same steps as those of the operation performed by the content display device in accordance with Embodiment 5 are designated by the same reference numerals as those used in FIG. 27, and the explanation of those steps will be omitted or simplified hereafter.

First, like in steps ST101 to ST120 of Embodiment 1, the user A makes a content watching request of the content display device 100 so as to acquire the server address and the configurator identification information, and then informs them to the configurator B. The configurator B which has received the notification makes an initial setting by using the content setting client 108, and receives a setting screen sent back thereto. The setting screen which the configurator B acquires at this time is the same as that shown in FIG. 28. The configurator B further transmits the content setting to the content setting server means 107 (steps ST121 to ST123), and the content setting server means 107 writes the content setting transmitted thereto in the content setting storage means 106 (step ST124). Because these operations are the same as those of Embodiment 1, the detailed explanation of the operations will be omitted hereafter.

Figure 27:
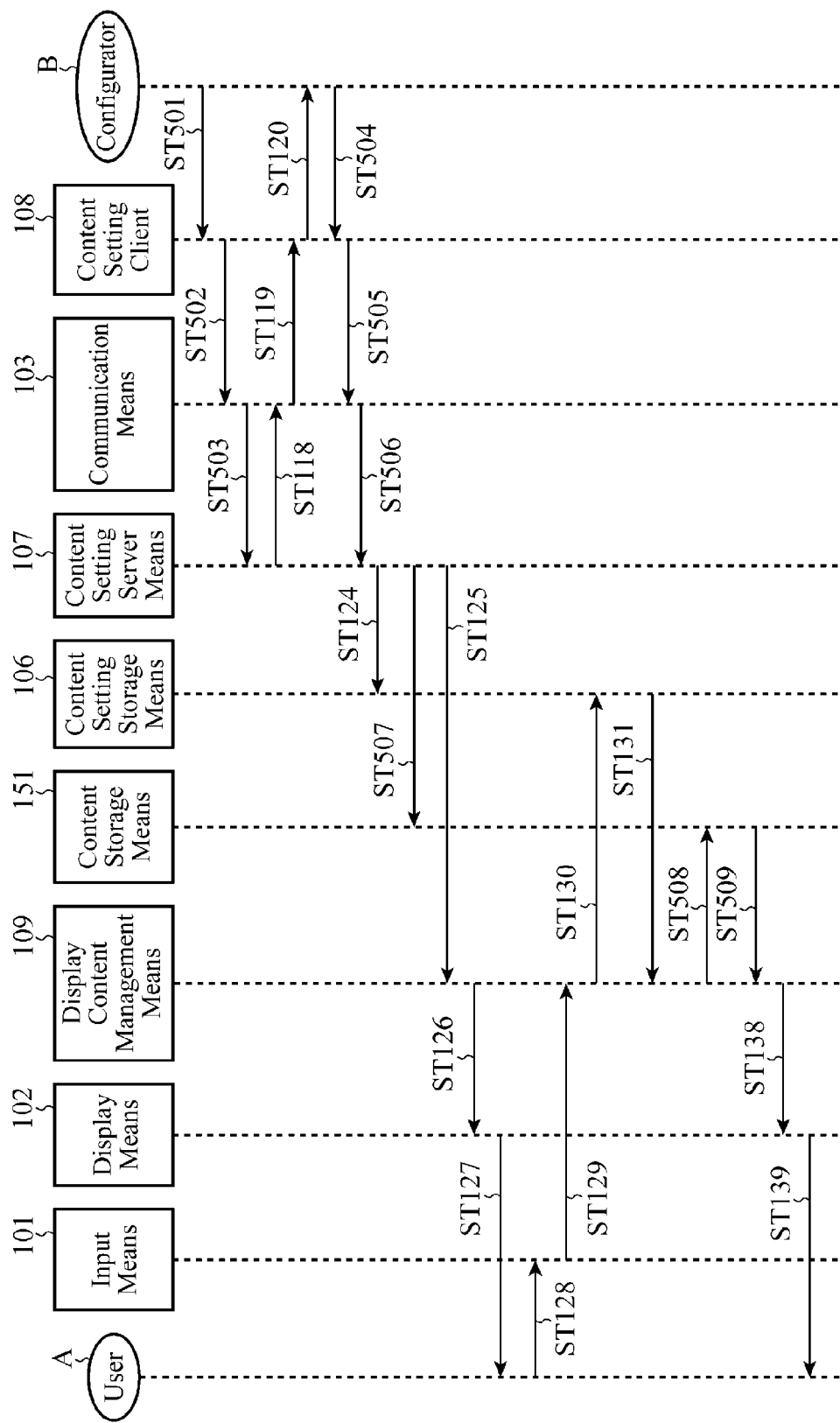
FIG. 27 is a flow chart showing the operation of the content display device in accordance with Embodiment 5 of the present invention.

Next, the content setting server means 107 makes a request of a content receiving means 104 to promptly receive the content set now (step ST510). The content receiving means 104 issues a content request to a content 105 via the communication means 103 (steps ST133 and ST134). The content 105 sends the content back to the content setting server means 107 via the communication means 103 and the content receiving means 104 (steps ST135, ST136, and ST511). The content setting server means 107 stores the content received thereby in the content storage means 151 (step ST507). After that, the content display device performs the same operation as that performed in steps ST125 to ST135 in the flow chart of FIG. 27 showing the case in which the configurator B uploads a content which the configurator itself has.

As mentioned above, because the content display device in accordance with this Embodiment 5 is configured in such a way as to have the content storage means 151 for storing a content which the content setting client 108 uploads by itself therein, the content display device uploads a content other than the content 105 on the network, e.g., a moving image file or the like existing on a PC of a configurator, and enables the user to watch the moving image file on the content display device.

Furthermore, because the content display device in accordance with this Embodiment 5 is configured in such a way as to have the content storage means 151 for storing a content 105 on the network, also when a content 105 on the network is provided, the content display device enables the user to continuously watch the content.

Embodiment 6

Figure 30:
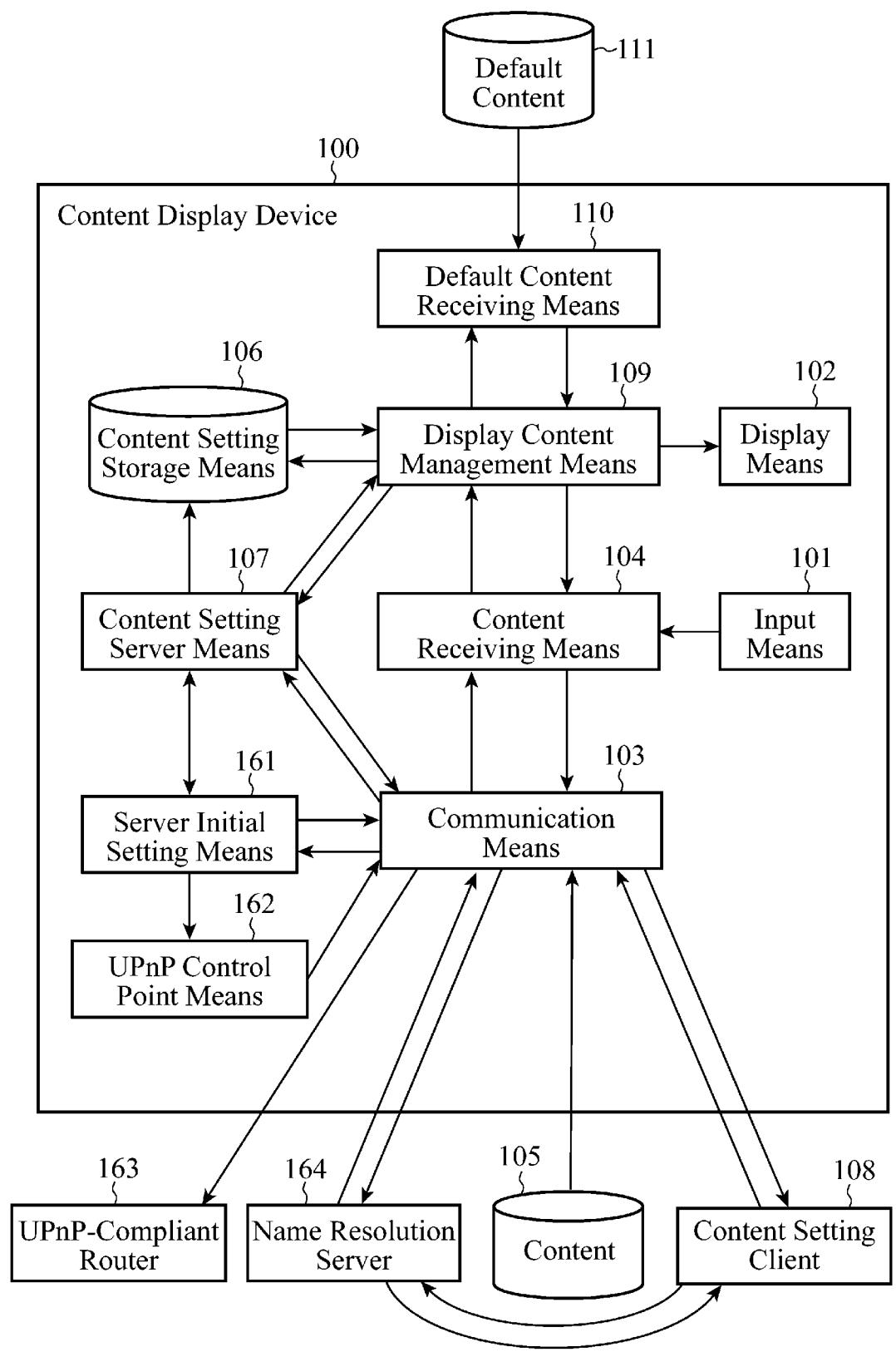
FIG. 30 is a block diagram showing the structure of a content display device in accordance with Embodiment 6 of the present invention.

FIG. 30 is a block diagram showing the configuration of a content display device in accordance with Embodiment 6 of the present invention. In the content display device in accordance with this Embodiment 6, a server initial setting means and a UPnP control point means are added to the components of the content display device shown in FIG. 1, and a UPnP-compliant router and a name resolution server are also added as external devices. Hereafter, the same components as those of the content display device in accordance with Embodiment 1 are designated by the same reference numerals as those used in Embodiment 1, and the explanation of the components will be omitted or simplified hereafter. The above-mentioned means can be added to the components of the content display device 100 in accordance with any one of Embodiments 2 to 5.

The server initial setting means 161 is a means of automatically making an initial setting to open a content setting server means 107 to the public on a network, and automates making the content setting server means 107 public on the Internet in cooperation with the content setting server means 107 and the UPnP control point means 162. Furthermore, in order to set a name resolution for the name resolution server 164 which will be mentioned below, a function of making a DNS setting to the name resolution server 164 is needed.

The UPnP control point means 162 communicates with the UPnP (Universal Plug and Play)-compliant router 163 on the network, which will be mentioned below, and automates making the content setting server means 107 public. Furthermore, when the UPnP-compliant router 163 provides an NAT (Network Address Translation) service for the internal network, the UPnP control point means 162 causes the UPnP-compliant router 163 to carry out port mapping by using a UPnP function without making users consciously operate the UPnP-compliant router. The port mapping is a function, which the UPnP-compliant router 163 has, of transmitting a specific port having an address on the external network to a specific internal network address (in this case, the address of this content display device 100).

The UPnP-compliant router 163 is a router on the network in where the content display device 100 exists. In this embodiment, it is assumed that the UPnP-compliant router is a broadband router for connecting the internal network in which this content display device 100 exists with the Internet.

The name resolution server 164 exists on the network, and solves a correspondence between the address of the content setting server means 107 and the name on the network. The name resolution server 164 is also a DNS (Domain Name System) server which brings a domain name on the Internet into correspondence with an IP (Internet Protocol) address, and it is assumed that the name of the content setting server means 107 on the network is a domain name on the Internet. In addition, it is desirable that the name resolution server 164 is a dynamic DNS server in order to support the dynamically-varying IP address of this content display device 100.

Figure 31:
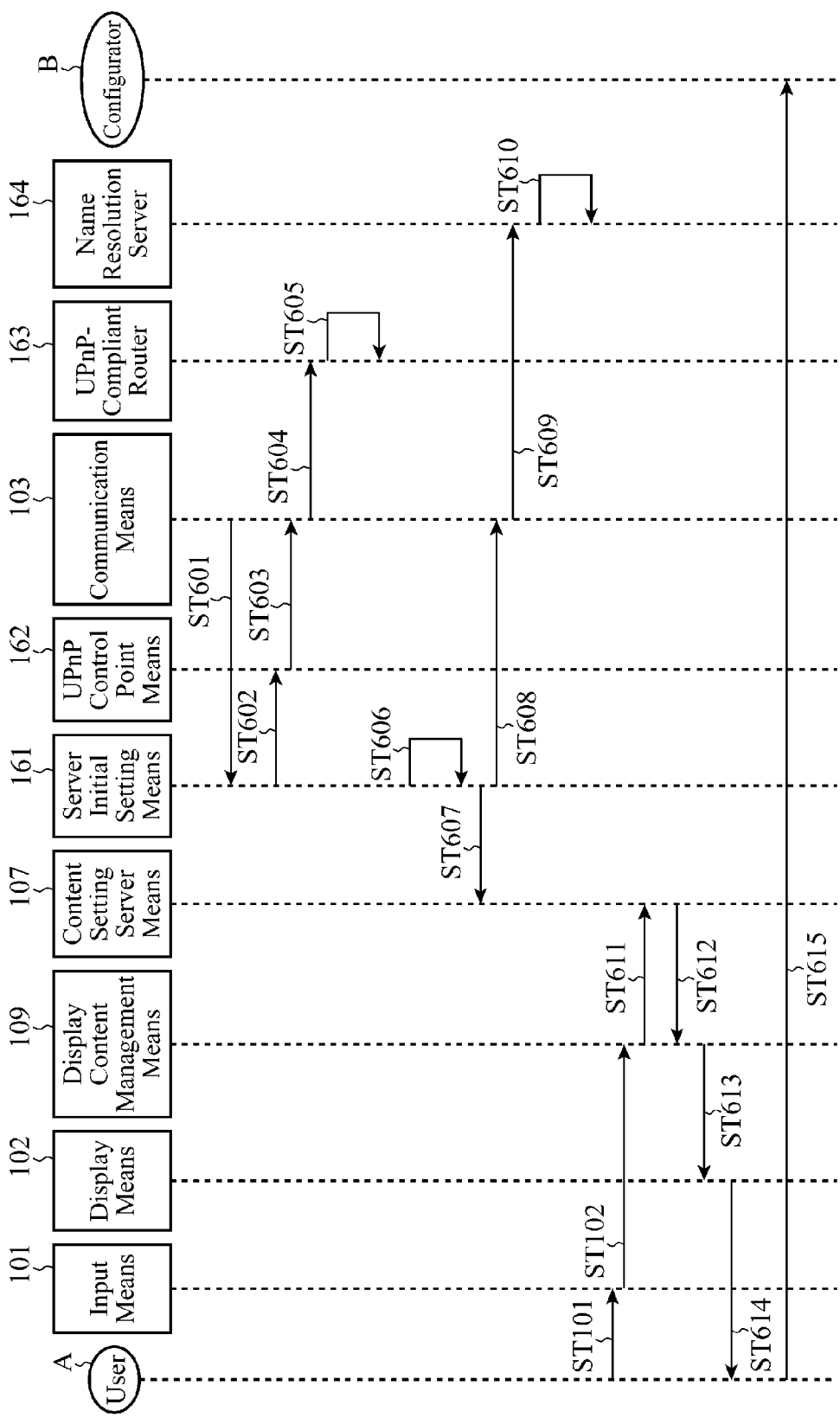
FIG. 31 is a flow chart showing the operation of the content display device in accordance with Embodiment 6 of the present invention.

An operation which is performed by the content display device until a configurator uploads a content which the configurator itself has to the content display device after the configurator makes an initial setting to the content setting server means 107 will be explained with reference to a flow chart of FIG. 31. Hereafter, the same steps as those of the operation performed by the content display device in accordance with Embodiment 1 are designated by the same reference numerals as those used in FIG. 4, and the explanation of the steps will be omitted or simplified hereafter.

A user A makes a content watching request of the content display device 100 so as to acquire the server address and configurator identification information, and then informs them to a configurator B. The configurator B which has received the notification makes an initial setting by using a content setting client 108. Because this operation is the same as that performed in steps ST101 to ST117 of Embodiment 1, the detailed explanation of the operation will be omitted hereafter.

Next, an operation which is performed by the content display device until the user informs the server address and the configurator identification information to the configurator after the content display device 100 in accordance with Embodiment 6 is connected to the network for the first time will be explained with reference to a flow chart of FIG. 31. The operations which are not shown in FIG. 31 are the same as those of Embodiment 1. Hereafter, the same steps as those of the operation performed by the content display device in accordance with Embodiment 1 are designated by the same reference numerals as those used in FIG. 4, and the explanation of the steps will be omitted or simplified hereafter.

When the content display device 100 is connected to the network, a communication means 103 which has detected the connection of the content display device to the network informs the network connection to the server initial setting means 161 (step ST601). The server initial setting means 161 which has received the notification requests the UPnP control point means 162 to output a port mapping execution command to the UPnP-compliant router 163 (step ST602). The UPnP control point means 162 commands the UPnP-compliant router 163 to carry out the port mapping via the communication means 103 (steps ST603 and ST604). The UPnP-compliant router 163 which has received the command makes a port mapping setting (step ST605).

The server initial setting means 161 further determines the domain name of the content setting server means 10 which is the name on the Internet of the content setting server means 107 (step ST606). Although a determining method of determining the domain name is not particularly limited, it is preferable that the domain name is a sub-domain (e.g., 123456.example.com) of a sub-domain (e.g., example.com) of gTLD (generic Top Level Domain) which is pre-registered into a registry in which domain names are managed. At this time, the server initial setting means needs to determine the domain name of the content setting server means in such a way that the sub-domain "123456" does not overlap among the plurality of content display devices. The server initial setting means does not have to determine the domain name of the content setting server means after the content display device is connected to the network for the first time. For example, the content display device can be configured in such a way as to determine the domain name of the content setting server means at the factory prior to shipment. The domain name determined by the server initial setting means 161 is informed to the content setting server means 107 (step ST607).

The server initial setting means 161 accesses the predetermined name resolution server 164 via the communication means 103, and makes a DNS setting request (steps ST608 and ST609). The name resolution server 164 which has received the setting makes a DNS setting, and brings the domain name into correspondence with the IP address of the content display device 100 (step ST610).

After that, the user A makes a content watching request of a display content management means 109 via an input means 101 (steps ST101 and ST102). The display content management means 109 which has received the request inquires of the content setting server means 107 about the server name (step ST611), and the content setting server means 107 sends the server name back to the display content management means (step ST612). The display content management means 109 displays the server name and the configurator identification information on a display means 102 (step ST613).

Figure 32:
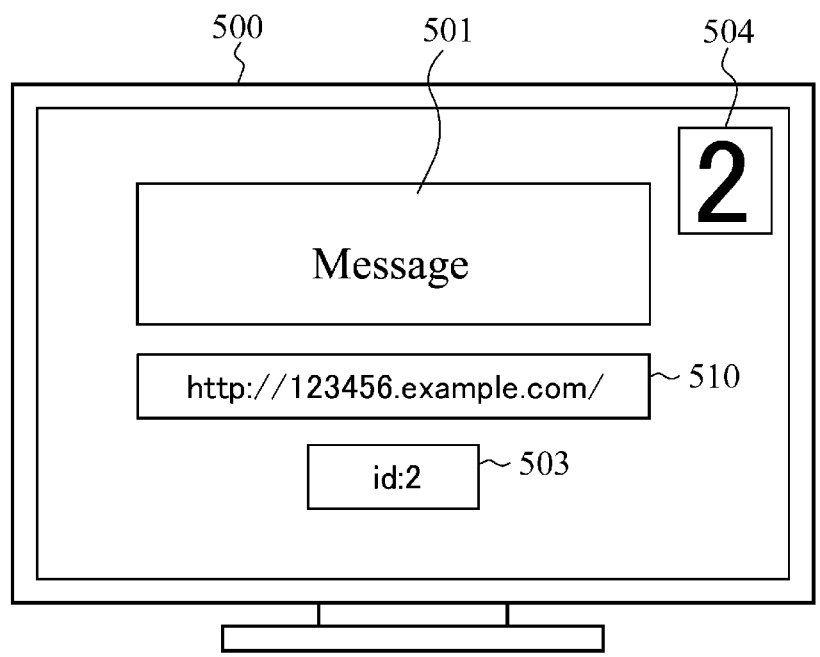
FIG. 32 is a view showing information displayed on a display means of the content display device in accordance with Embodiment 6 of the present invention.

FIG. 32 shows an example of the display of the domain name and the configurator identification information on the display means 102. On the screen 500 of the display means 102, a message 501, identification information 503, a channel number 504, and a content setting server address 510 are displayed. The content setting server address 510 shows the address including the domain name of the content setting server means 107. For example, "Please tell your friend this address and id" or the like is displayed in the message 501.

The user A acquires the server name of the content setting server means 107 (i.e., the address including the domain name) and the configurator identification information from the display means 102 (step ST614), and then informs the server name and the configurator identification information to the configurator B which the user A has chosen (step ST615). Up to an operation which is performed by the content display device until the user starts watching the content is the same as that performed in steps ST108 to ST139 of Embodiment 1. Furthermore, the configurator B inputs the address informed thereto to the content setting client 108, and the content setting client 108 inquires of the name resolution server 164 about the IP address corresponding to the domain name.

As mentioned above, because the content display device in accordance with this Embodiment 6 is configured in such a way as to have the UPnP control point means 162 for automatically issuing the port mapping command to the UPnP-compliant router 163, the content display device can automate making the content setting server means 107 public on the Internet at the time when the broadband router provides an NAT service, thereby enabling the user to watch a content without causing the user to make a troublesome port mapping setting.

Furthermore, because the content display device in accordance with this Embodiment 6 is configured in such a way as to have the server initial setting means 161 for determining the domain name of the content setting server means 107, and for making a DNS setting request of the name resolution server 164, the content display device enables the user to see the domain name instead of the IP address to acquire the address in the same format as the address format which the user sees usually. As a result, the load on the user can be reduced.

In addition, because the content display device in accordance with this Embodiment 6 is configured in such a way as to use the dynamic DNS function, the content display device can save itself from having to reinform the address to the configurator when the IP address is changed dynamically.

Embodiment 7

Figure 33:
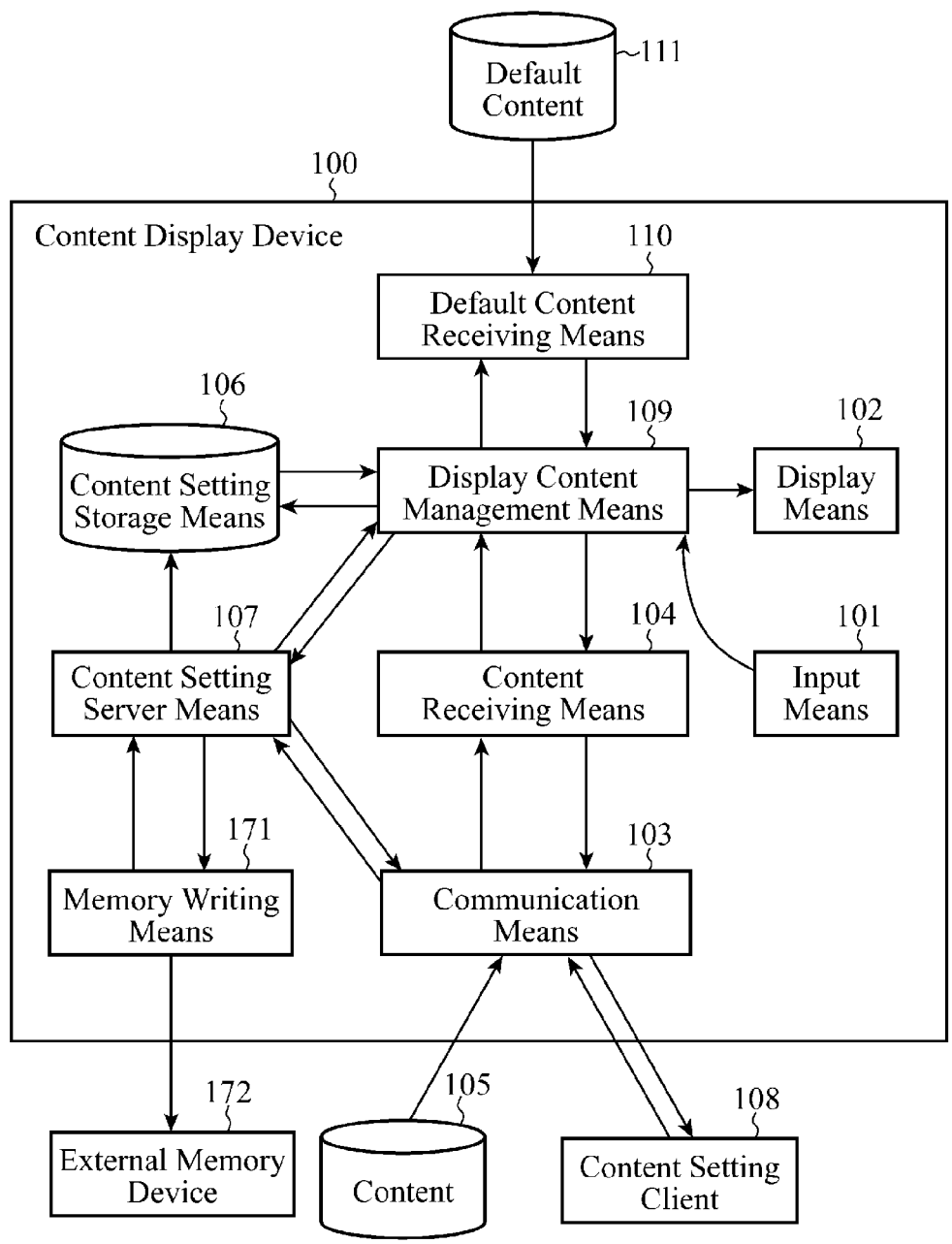
FIG. 33 is a block diagram showing the structure of a content display device in accordance with Embodiment 7 of the present invention.

FIG. 33 is a block diagram showing the configuration of a content display device in accordance with Embodiment 7 of the present invention. In the content display device in accordance with this Embodiment 7, a memory writing means is added to the components of the content display device of FIG. 1, and an external memory device is also added as an external device. Hereafter, the same components as those of the content display device in accordance with Embodiment 1 are designated by the same reference numerals as those used in Embodiment 1, and the explanation of the components will be omitted or simplified hereafter. The memory writing means can be added to the components of the content display device in accordance with any one of Embodiments 2 and 6, and the external memory device can also be added as an external device.

Instead of displaying an server address, configurator identification information, and authentication information on a display means 102, the content display device writes them in the external memory device 172 owned by a user using the memory writing means 171. The external memory device 172 is a memory which is owned by the user and which can store information. In this Embodiment 7, it is assumed that the memory writing means 171 is a USB (Universal Serial Bus) interface, and the external memory device 172 is a USB memory. As long as the content display device can write information into the external memory device by using the memory writing means, another memory writing unit and another memory device can be used as the memory writing means and the external memory device.

Figure 34:
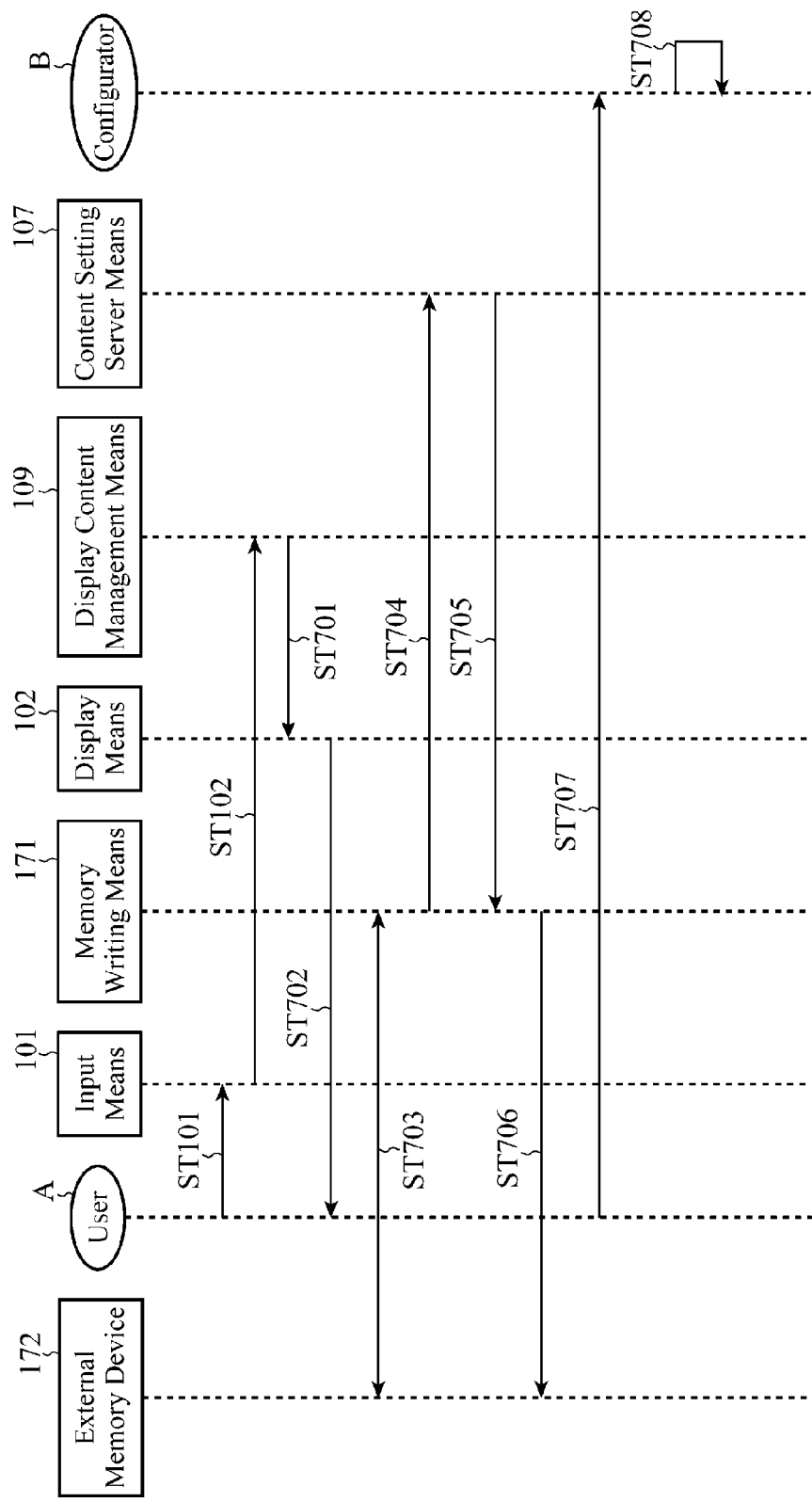
FIG. 34 is a flow chart showing the operation of the content display device in accordance with Embodiment 7 of the present invention.

Next, an operation which the content display device performs until the content display device informs the server address and the configurator identification information to a configurator after a user issues a content watching request to the content display device 100 will be explained with reference to a flow chart of FIG. 34. Hereafter, the same steps as those of the operation performed by the content display device in accordance with Embodiment 1 are designated by the same reference numerals as those used in FIG. 4, and the explanation of the steps will be omitted or simplified hereafter.

A user A makes a content watching request by using an input means 101 (steps ST101 and ST102). In this case, it is assumed that a channel number specified by the user is "2". Like in the case of Embodiment 1, it is assumed that any content setting which associates this request with a content has not existed yet at this time. A display content management means 109 to which the content watching request has been inputted displays a message for making the user A use the external memory device 172 on the display means 102 (step ST701).

Figure 35:
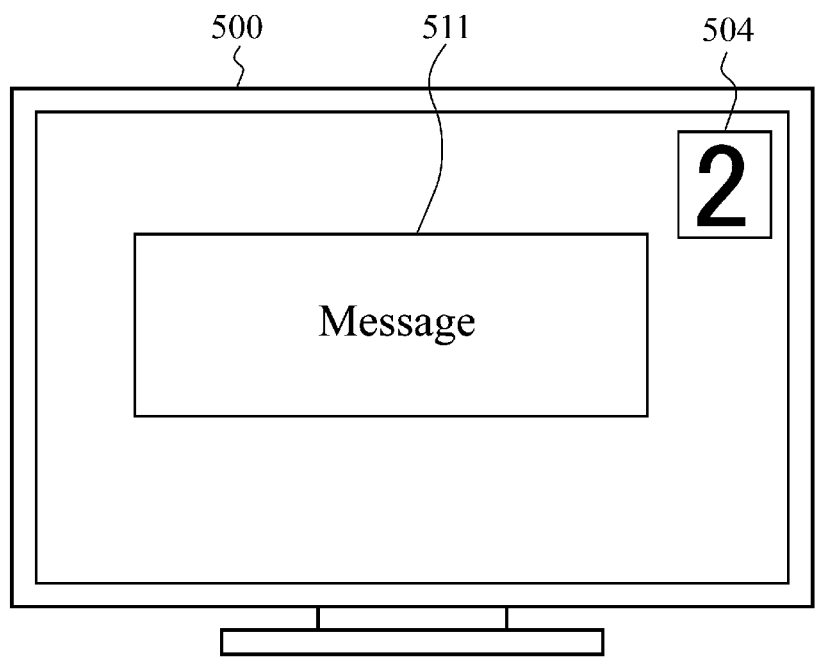
FIG. 35 is a view showing information displayed on a display means of the content display device in accordance with Embodiment 7 of the present invention.

FIG. 35 shows an example of the display of the message for the user A on the display means 102. A channel number 504 and a message 511 are displayed on the screen 500 of the display means 102. The message 511 shows a utilizing method for the user A. For example, "please insert your USB memory into the USB port, and send the USB memory to your friend" or the like is displayed so as to urge the user to connect the USB memory which is the external memory device 172 to the content display device 100.

When the user A receives the message from the display means 102 (step ST702), he or she connects the external memory device 172 to the memory writing means 171 (step ST703). The memory writing means 171 which has detected that the external memory device 172 is connected to the memory writing means makes a request of a content setting server means 107 for the server address and the configurator identification information (step ST704). The content setting server means 107 sends the server address and the configurator identification information back to the memory writing means 171 (step ST705). The memory writing means 171 writes the server address and the configurator identification information in the external memory device 172 connected thereto (step ST706).

The user A removes the external memory device 172 from the memory writing means 171, and sends the external memory device to the configurator B which the user has chosen (step ST707). Although a method of sending the external memory device to the configurator is not particularly limited, for example, the external memory device is sent via personal delivery, mail, or the like. The configurator B which has received the external memory device 172 sent thereto reads the server address and the configurator identification information which are written in the external memory device 172 by using a device such as a PC (step ST708). Because up to an operation which is performed by the content display device until the user starts watching the content is the same as that performed in steps ST108 to ST139 of Embodiment 1, the explanation of the operation will be omitted hereafter.

As mentioned above, because the content display device in accordance with this Embodiment 7 is configured in such a way as to have the memory writing means 171 for writing the server address and the configurator identification information in the external memory device 172, the content display device can inform pieces of hard-to-read information including the server address and the configurator identification information directly to the configurator without making the user read the pieces of information, thereby being able to reduce the load on the user. Furthermore, because the content display device also enables the configurator to receive the external memory device, instead of the hard-to-read server address and configurator identification information, and read the server address and configurator identification information from the external memory device by using a device, such as a PC, the configurator is enabled to operate a setting client without spending time and effort on input of the received information into a PC or the like.

INDUSTRIAL APPLICABILITY

As mentioned above, because the content display device in accordance with the present invention can easily associate a setting with display of information and can further make a request of an arbitrary configurator to make a setting to acquire information with flexibility, the content display device in accordance with the present invention is suitable for use as a content display device which computer-shy people and information-starved people use.

The invention claimed is:

1. A content display device comprising:
an input unit configured to accept a channel identifier from outside the content display device;
a display unit configured to display content associated with the channel identifier accepted by said input unit;
a communication unit configured to connect with a other equipment on network to carry out communications;
a receiving unit configured to receive content from other equipment on the network via said communication unit;
a content setting storage unit configured to store a content setting which indicates an association among the channel identifier accepted by said input unit, an address of a content on the network, and an external client on the network;
a content setting server unit configured to update and manage content settings stored in said content setting storage unit; and
a display content management unit configured to determine whether an address of a content is in a content setting corresponding to the channel identifier accepted by the input unit, when said address of the content is not in said content setting, control the display unit to display information for accessing the content setting server unit from the external client represented in said content setting and identification information for identifying the external client device,
wherein the content setting server unit is further configured to receive information on the content setting from the external client device which has accessed the content setting server unit by using the information displayed on the display unit, and update said content setting in accordance with the received information.

2. The content display device according to claim 1, wherein the input unit has numeric keys or an up-and-down key.

3. The content display device according to claim 1, further comprising a default content receiving unit configured to receive, from the network a preset default content to which a specific channel identifier is assigned,
wherein the default content receiving unit is further configured to receive a default content corresponding to the channel identifier accepted by the input unit, and
wherein the display content management unit is further configured to control the display unit to display the default content received by the default content receiving unit.

4. The content display device according to claim 1, further comprising an authentication unit configured to issue authentication information for authenticating the external client device, and carry out authentication of said external client device by using said issued authentication information, and wherein the display content management unit is further configured to display said authentication information issued by said authentication unit,
the content setting server unit is further configured to receive, from the external client device, authentication information corresponding to the authentication information displayed on the display unit, and supply the received authentication information to the authentication unit, and
the authentication unit is further configured to carry out an authentication with respect to the authentication information supplied by the content setting server unit.

5. The content display device according to claim 1, wherein the content setting server unit or the communication unit are further configured to encrypt data of communications with the external client device.

6. The content display device according to claim 1, further comprising an encoding unit configured to encode at least one of the information to be displayed on the display device through the control of the display content management unit to convert said information into an identifier code which is to be decoded by an external decode.

7. The content display device according to claim 1, further comprising a speaker for outputting an audio message corresponding to at least one of the information to be displayed on the display device through the control of the display content management unit.

8. The content display device according to claim 1, further comprising a memory writing unit configured to write, in an external memory device, at least one of the information to be displayed on the display device through the control of the display content management unit,
wherein the display content management unit is further configured to control the display device to display a message for urging a user to connect said external memory device with the content display device.

9. The content display device according to claim 1, further comprising a group management unit configure to carry out group management among a plurality of configurators each of which operates an external client device, and provides a communication function for each group.

10. The content display device according to claim 1, further comprising a content storage unit configured to store a content which has been uploaded by the external client device.

11. The content display device according to claim 1, further comprising a server initial setting unit configured to make an initial setting to release the content setting server unit on the network.

12. The content display device according to claim 11, wherein the server initial setting unit is further configured to determine a name of the content setting server unit utilized on the network, and output a DNS (Domain Name System) setting request to a name resolution server which arranges a correspondence between said name and an IP address of the content display device to solve said correspondence.

13. The content display device according to claim 1, further comprising a UPnP control point unit configured to communicate with a UPnP (Universal Plug and Play) router on an internal network in which said content display device exists, and automate the release of the content setting server unit one the network.

14. The content display device according to claim 4, further comprising an encoding unit configured to encode at least one of the information to be displayed on the display device through the control of the display content management unit.

15. The content display device according to claim 4, further comprising a speaker for outputting an audio message corresponding to at least one of the information to be displayed on the display device through the control of the display content management unit.

16. The content display device according to claim 4, further comprising a memory writing unit configured to write, in an external memory device, at least one of the information to be displayed on the display device through the control of the display content management unit,
   wherein the display content management unit is further configured to control the display device to display a message for urging a user to connect said external memory device with the content display device.

* * * * *